(12) United States Patent
Iida et al.

(10) Patent No.: US 11,836,398 B2
(45) Date of Patent: Dec. 5, 2023

(54) INFORMATION PROCESSING APPARATUS AND CONTROL METHOD THEREFOR

(71) Applicant: CANON KABUSHIKI KAISHA, Tokyo (JP)

(72) Inventors: Toshihiko Iida, Ibaraki (JP); Yoshiji Kanamoto, Tokyo (JP); Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/665,273

(22) Filed: Feb. 4, 2022

(65) Prior Publication Data

US 2022/0156020 A1    May 19, 2022

Related U.S. Application Data

(63) Continuation of application No. PCT/JP2020/027601, filed on Jul. 16, 2020.

(30) Foreign Application Priority Data

Aug. 7, 2019   (JP) ................................ 2019-145575

(51) Int. Cl.
*G06F 3/12* (2006.01)
*B41J 29/393* (2006.01)

(52) U.S. Cl.
CPC .......... *G06F 3/1208* (2013.01); *B41J 29/393* (2013.01); *G06F 3/1207* (2013.01); *G06F 3/1256* (2013.01); *G06F 3/1272* (2013.01); *G06F 3/1287* (2013.01); *G06F 3/1204* (2013.01)

(58) Field of Classification Search
CPC .... G06F 3/1208; G06F 3/1207; G06F 3/1256; G06F 3/1272; G06F 3/1287; G06F 3/1282; B41J 29/393; B41J 29/42
USPC ........................................................ 358/296
See application file for complete search history.

(56) References Cited

U.S. PATENT DOCUMENTS

| | | | | |
|---|---|---|---|---|
| 5,768,487 A | * | 6/1998 | LeClair | G06F 3/1296 358/1.13 |
| 2005/0243365 A1 | * | 11/2005 | Noda | H04N 1/32545 358/1.15 |
| 2006/0274356 A1 | * | 12/2006 | Bellagamba | G06Q 30/0251 358/1.18 |
| 2009/0244165 A1 | * | 10/2009 | Saita | B41J 29/393 347/19 |
| 2012/0147413 A1 | | 6/2012 | Giess | |

FOREIGN PATENT DOCUMENTS

| | | |
|---|---|---|
| CN | 101166220 A | 4/2008 |
| CN | 103399717 A | 11/2013 |
| CN | 103459159 A | 12/2013 |
| EP | 2778892 A2 | 9/2014 |

(Continued)

*Primary Examiner* — Darryl V Dottin
(74) *Attorney, Agent, or Firm* — Canon U.S.A., Inc., IP Division

(57) ABSTRACT

Instruction information on quality inspection of a printed matter is acquired, and it is determined whether the instruction information identifies an inspection target by identification information of an object or by coordinate information. An inspection position is identified in accordance with the determination result, and quality inspection of the printed matter is performed by using the identified inspection position.

10 Claims, 26 Drawing Sheets

(56) References Cited

FOREIGN PATENT DOCUMENTS

| | | | |
|---|---|---|---|
| JP | 2004-351814 | A | 12/2004 |
| JP | 2007148027 | A | 6/2007 |
| JP | 2012-206461 | A | 10/2012 |
| JP | 2017-191979 | A | 10/2017 |
| JP | 2020-006603 | A | 1/2020 |
| WO | 2014/108460 | A2 | 7/2014 |

* cited by examiner

FIG. 12A

```
<?xml version="1.0" encoding="UTF-8"?>
<JDF ID="ID01" JobPartID="JobPartID01" Type="Combined"
  Types="LayoutPreparation Imposition Interpreting Rendering DigitalPrinting"
  Activation="Active" Status="Ready" Version="1.3" Category="DigitalPrinting"
  ICSVersions="IDP_L1-1.0 Base_L1-1.0" MaxVersion="1.3"
  xmlns="http://www.CIP4.org/JDFSchema_1_1"
  xmlns:cj="http://www.canon.com/ns/CanonJDF"
  JobID="JobID01" DescriptiveName="ProductAAA">

<ResourcePool>

<RunList Class="Parameter" ID="IDRL" Status="Available" PartIDKeys="Run">
      <RunList Run="0">
        <LayoutElement>
          <FileSpec MimeType="application/pdf" URL="cid:Sample" TotalPage="20"/>
        </LayoutElement>
      </RunList>                                                              1201
    </RunList>
1202 <DigitalPrintingParams Class="Parameter" ID="IDDPP" Status="Available"
      Collate="SheetSetAndJob" PartIDKeys="RunIndex" Amount="20000">
      <MediaRef rRef="MED_000"/>                      1203
                                1204
1206   <DigitalPrintingParams RunIndex="4 199~209 249">
        <MediaRef rRef="Med_001"/>
      </DigitalPrintingParams>      1205
                          1207
1208   <DigitalPrintingParams RunIndex="0">
        <MediaRef rRef="Med_002"/>
      </DigitalPrintingParams>   1209
                         1210
    </DigitalPrintingParams>                                          1212
1211 <Media ID="MED_000" Class="Consumable" Status="Available" Dimension="842 1191"
      DesciptiveName="Media1"/>  1213                               1215
1214 <Media ID="MED_001" Class="Consumable" Status="Available" Dimension="842 1191"
      DesciptiveName="Media2(coated)"/>  1216
1217 <Media ID="MED_002" Class="Consumable" Status="Available" Dimension="842 1191"
      DesciptiveName="Media3(cardboard)"/>
                                                                     1218
  </ResourcePool>              1219
  <ResourceLinkPool>

</ResourceLinkPool>
</JDF>
```

FIG. 12B

```
<?xml version="1.0" encoding="UTF-8"?>
<PRX xmlns:prx="http://xxx.org/prx" xmlns:cc="http://yyy.com/CxF" xmlns="http://zzz.org/prx"
 xmlns:xsi="http://www.w3.org/2001/XMLSchema-instance"
 xsi:schemaLocation="http://xxx.yyy.zzz.org/prx PRX.xsd">

<PRXInfo><PRXDate>2019-03-27</PRXDate><PRXId>xxx</PRXId></PRXInfo>          ⎫
    <BuyerInfo><CompanyName>ABC Ltd.</CompanyName><Location>xxx</Location></BuyerInfo> ⎬ ~1220
    <GradingInfo> ~1221                                                          ⎭
      <Grade DisplayLabel="Excellent" Rank="10"><ValueRange>
         <LogicalOperator>GT</LogicalOperator><CalculatedValue>8</CalculatedValue>
1222 </ValueRange></Grade>
      <Grade DisplayLabel="Good" Rank="8"><ValueRange>
         <LogicalOperator>GT</LogicalOperator><CalculatedValue>7</CalculatedValue>
1223 </ValueRange></Grade>
      <Grade DisplayLabel="Acceptable" Rank="7"><ValueRange>
         <LogicalOperator>GT</LogicalOperator><CalculatedValue>6.5</CalculatedValue>
1224 </ValueRange></Grade>
      <Grade DisplayLabel="Poor" Rank=""><ValueRange>
         <LogicalOperator>LT</LogicalOperator><CalculatedValue>6.5</CalculatedValue>
1225 </ValueRange></Grade>
      :
      <MinimumAcceptableRank>8</MinimumAcceptableRank> ~1226
      <DesiredRank>9</DesiredRank>
    </GradingInfo>                    1227

<QualityGoals> ~1228
      <Color> ~1229
        <ColorScore>
          <ColorScoringScale>
1231 ~       <UoM>dE</UoM>
            <ParameterScore DisplayLabel="Excellent" Rank="10"><ValueRange>
1233 ~         <LogicalOperator>LT</LogicalOperator><CalculatedValue>1.0</CalculatedValue>
            <ValueRange></ParameterScore>
            <ParameterScoreDisplayLabel="Good" Rank="9"><ValueRange>
1234 ~         <LogicalOperator>LT</LogicalOperator><CalculatedValue>2.0</CalculatedValue>
            <ValueRange></ParameterScore>
            <ParameterScoreDisplayLabel="Acceptable" Rank="8"><ValueRange>
1235 ~         <LogicalOperator>LT</LogicalOperator><CalculatedValue>4.0</CalculatedValue>
            <ValueRange></ParameterScore>
            <ParameterScore DisplayLabel="Poor" Rank=""><ValueRange>
1236 ~         <LogicalOperator>GT</LogicalOperator><CalculatedValue>4.0</CalculatedValue>
            <ValueRange></ParameterScore>
          </ColorScoringScale>
          <MinimumAcceptableRank>8</MinimumAcceptableRank> ~1237
          <DesiredRank>10</DesiredRank>
          <CalculationVariable>cs</CalculationVariable>
1238   </ColorScore>

<ColorParameter>
          <ParameterName>CorpLogo</ParameterName>
1239      <ColorReportType>direct</ColorReportType>
          <SamplingPosition>
1240 ~       <SamplingPositionImageIdLink>CL1</SamplingPositionImageIdLink>
          </SamplingPosition>
1241 ~    <CxFReferenceObjectIdLink>CxF001</CxFReferenceObjectIdLink>
          <CalculationVariable>CA</CalculationVariable>
        </ColorParameter>
        :
      <Color>
        :
    </QualityGoals>  1242

<CxFReferenceData>
      <cc:CxF>
        <cc:Resources>
          <cc:ObjectCollection>
            <cc:Object ObjectType="Target" Name="1" Id="CxF001">
1243 ~         <cc:CreationDate>2007-06-14T00:00:00-08:00</cc:CreationDate>
              <cc:ColorValues>
                <cc:ReflectanceSpectrum StartWL="380" ColorSpecification="CS1">
1244 ~            0.0179408 0.0189865 ... 0.0448929
                </cc:ReflectanceSpectrum>
              </cc:ColorValues>
            </cc:Object>
            :
          <cc:ObjectCollection>
        <cc:Resources>         1245
      </cc:CxF>
    </CxFReferenceData>                      1246
    <SamplingPositionImageData>
      <PositionLocationImage Id="CL1" ObjectLink="6 0 R"/>
      :
    <SamplingPositionImageData>
</PRX>
```

FIG. 12C

```
MEASURED DATA:
DATE: 2019-3-27:
TIME: 11:45:00 JST:

OBJECT ID: 6 0 R:           1261
OBJECT COUNT: 1:            1262
METADATA: (XXXX:YYY), (ZZZ:AAA), (BBB:CCC):

SPECTRUM DATA:
0.222
0.333
0.444
0.001
0.222
0.234       1263
0.111
0.333
0.555
0.666
. . .
0.222
SPECTRUM DATA END:
```

FIG. 12D

```
<?xml version="1.0" encoding="UTF-8"?>
<PQX xmlns:pqx="http://xxx.org/pqx" xmlns:cc="http://yyy.com/CxF" xmlns="http://zzz.org/pqx"
  xmlns:xsi="http://www.w3.org/2001/XMLSchema-instance"
  xsi:schemaLocation="http://xxx.yyy.zzz.org/pqx PQX.xsd">

<PQXInfo><PQXDate>2019-03-27</PQXDate><PQXId>xxx</PQXId></PQXInfo>
<PrinterInfo><CompanyName>AAA Printing Company</CompanyName><Location>xxxxx</Location></PrinterInfo>  ～1267

<PressRunInfo>  ～1268
  <DatePrinted>2019-03-27</DatePrinted>
  <PrinterLotId>Lot No.3</PrinterLotId>
  <PrintMethod>ElectroPhotography</PrintMethod>
  <PressOperator>Mr. Right</PressOperator>
  <PrinterJobNumber>JobID01</PrinterJobNumber>
</PressRunInfo>

<CustomerCollection><Customer>ABC Ltd.</Customer></CustomerCollection>
<SampleCollection>  ～1272
  <Sample>
    <ColorReport>  ～1273
      <Measurement Id="001">
        <CxFSampleObjectIdLink>CXF001</CxFSampleObjectIdLink>  ～1274
      </Measurement>
      <SamplingPositionImageIdLink>CL1</SamplingPositionImageIdLink>  ～1275
    </ColorReport>
  </Sample>
</SampleCollection>
<CxFSampleData>  ～1276
  <CxF Id="CxF001">  ～1277
    <ReflectanceSpectrum>0.221 0.330 0.443 0.001 0.221 0.235 0.110 0.330 0.559 0.662 ... 0.221</ReflectanceSpectrum>  } 1278
    <CxF>
    ...
</CxFSampleData>
<SamplingPositionImageData>  ～1279
  <PositionLocationImage Id="CL1" ObjectLink="6 0 R" Count="1"/>  ～1280
  ...
<SamplingPositionImageData>
</PQX>
```

FIG. 16

| OBJECT ID 1601 | INSPECTION DETAIL 1602 | REFERENCE DATA 1603 | EVALUATION DATA 1604 |
|---|---|---|---|
| 50R | COLORIMETRY | corplogo.cxf | Excellent 10 LT1.0··· |
| 70R | COLORIMETRY | productlogo.cxf | Excellent 10 LT1.0··· |
| 100R | BARCODE | - | - |

FIG. 17

| | |
|---|---|
| BOOT LOADER | 401 |
| OPERATING SYSTEM | 402 |
| NETWORK CONTROL PROGRAM | 403 |
| FIRST RECEIVING PROGRAM | 404 |
| FIRST TRANSMISSION PROGRAM | 405 |
| PRINT JOB MANAGEMENT PROGRAM | 1701 |
| PRINT IMAGE MANAGEMENT PROGRAM | 1702 |
| MEDIA MANAGEMENT PROGRAM | 408 |
| SHEET COUNT PROGRAM | 409 |
| INSPECTION PROGRAM | 410 |

FIG. 20

| OBJECT | | INSPECTION POSITION |
|---|---|---|
| ID | COUNT | COORDINATES |
| 60R | 1 | 14235 410 |
| 30R | 1 | 16624 223 |
| 60R | 2 | 28470 410 |

2001, 2002, 2000, 2003

| OBJECT | | INSPECTION POSITION | |
|---|---|---|---|
| ID | COUNT | SHEET COUNT | COORDINATES |
| 60R | 1 | 67 | 165 410 |
| 30R | 1 | 79 | 34 223 |
| 60R | 2 | 134 | 165 410 |

2001, 2002, 2011, 2012, 2010

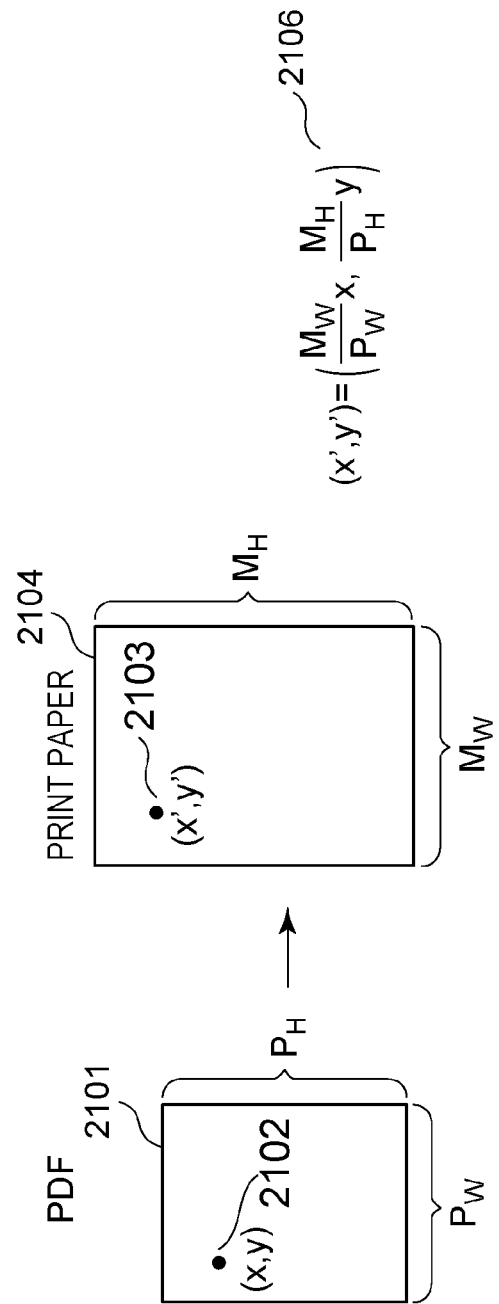

FIG. 22A

```
<SamplingPositionImageData>
    <PositionLocationImage>
            <Id>2 0 R</Id>  ~2201
            <ImageLink>./Sample.pdf</ImageLink>
    </PositionLocationImage>
</SamplingPositionImageData>
<SamplingPosition>
    <SamplingPositionImageIdLink>12345</SamplingPositionImageIdLink>
    <SamplingPositionMatrix>
        <UoM>mm</UoM>
        <Origin>BL</Origin>
</SamplingPositionMatrix>
</SamplingPosition>
```

FIG. 22B

```
<SamplingPositionImageData>
    <PositionLocationImage>
            <ImageLink>./Sample.pdf</ImageLink>
    </PositionLocationImage>
</SamplingPositionImageData>
<SamplingPosition>
    <SamplingPositionImageIdLink>12345</SamplingPositionImageIdLink>
    <SamplingPositionMatrix>
        <UoM>mm</UoM>
        <Origin>BL</Origin>
        <PositionDefinition PositionLabel="Logo">
            <XPosition>10</XPosition>
            <YPosition>20</YPosition>  ~2202
        </PositionDefinition>
    </SamplingPositionMatrix>
</SamplingPosition>
```

INFORMATION PROCESSING APPARATUS AND CONTROL METHOD THEREFOR

CROSS-REFERENCE TO RELATED APPLICATIONS

This application is a Continuation of International Patent Application No. PCT/JP2020/027601, filed Jul. 16, 2020, which claims the benefit of Japanese Patent Application No. 2019-145575, filed Aug. 7, 2019, both of which are hereby incorporated by reference herein in their entirety.

TECHNICAL FIELD

The present invention relates to quality requirements on a print product.

BACKGROUND ART

In the field of commercial printing, it is conceivable that information on requirements and a report on the quality of a product for which a customer makes a request of a printing company is desired to be electronically exchanged. Standards, such as PQX/PRX (Print Quality eXchange, Print Request eXchange) and JDF (Job Definition Format), are examples of the specifications for achieving the above. A series of processes in which a customer transmits by PRX requirements on the quality of a product required of a printing company and the printing company reports the quality of a product produced to the customer by PQX is electronized.

PTL 1 describes how to set points (representative points) to compare image data.

CITATION LIST

Patent Literature

PTL 1: Japanese Patent Laid-Open No. 2004-351814

At the time of providing requirements on quality, a customer needs to designate where the quality of a product is inspected.

For example, PRX that is an example of quality requirements data has specifications to designate an inspection position by coordinates. In other words, when arrangement of images of print data is changed, there is a problem that, even when only the arrangement of images is changed without changing the images, an inspection position needs to be designated again each time. In addition, a customer is also not able to flexibly designate an inspection target of a product.

In light of the above problem, it is an object of the present invention to provide a technology for a customer to be able to flexibly designate an inspection target of a product.

SUMMARY OF INVENTION

To achieve the above object, an information processing apparatus of the present invention includes acquisition means configured to acquire instruction information on quality inspection of a printed matter, determining means configured to determine whether the instruction information designates an inspection target by identification information of an object or by coordinate information, and inspection means configured to identify an inspection position in accordance with the determination result and perform quality inspection of the printed matter by using the identified inspection position.

Further features of the present invention will become apparent from the following description of exemplary embodiments with reference to the attached drawings.

BRIEF DESCRIPTION OF DRAWINGS

FIG. 12A is an example of print settings.

FIG. 12B is an example of quality requirements.

FIG. 12C is an example of an inspection result.

FIG. 12D is an example of quality report data.

FIG. 16 is a schematic view of a data table that stores designation on an inspection target object and inspection.

FIG. 17 is a software configuration diagram of an image forming apparatus in a third embodiment.

FIG. 20 is a schematic view of data tables that store an identifier of an object and an inspection position.

FIG. 21B is a view illustrating an example of calculating coordinates of an inspection position from PDF coordinates and imposition information.

FIG. 22A is an example of PRX (quality requirements data).

FIG. 22B is an example of PRX (quality requirements data).

DESCRIPTION OF EMBODIMENTS

Hereinafter, embodiments of the present invention will be described with reference to the drawings. The following embodiments do not limit the invention described in the appended claims. Not all combinations of features that will be described in the embodiments are indispensable for solutions of the invention.

First Embodiment

Figure 1:
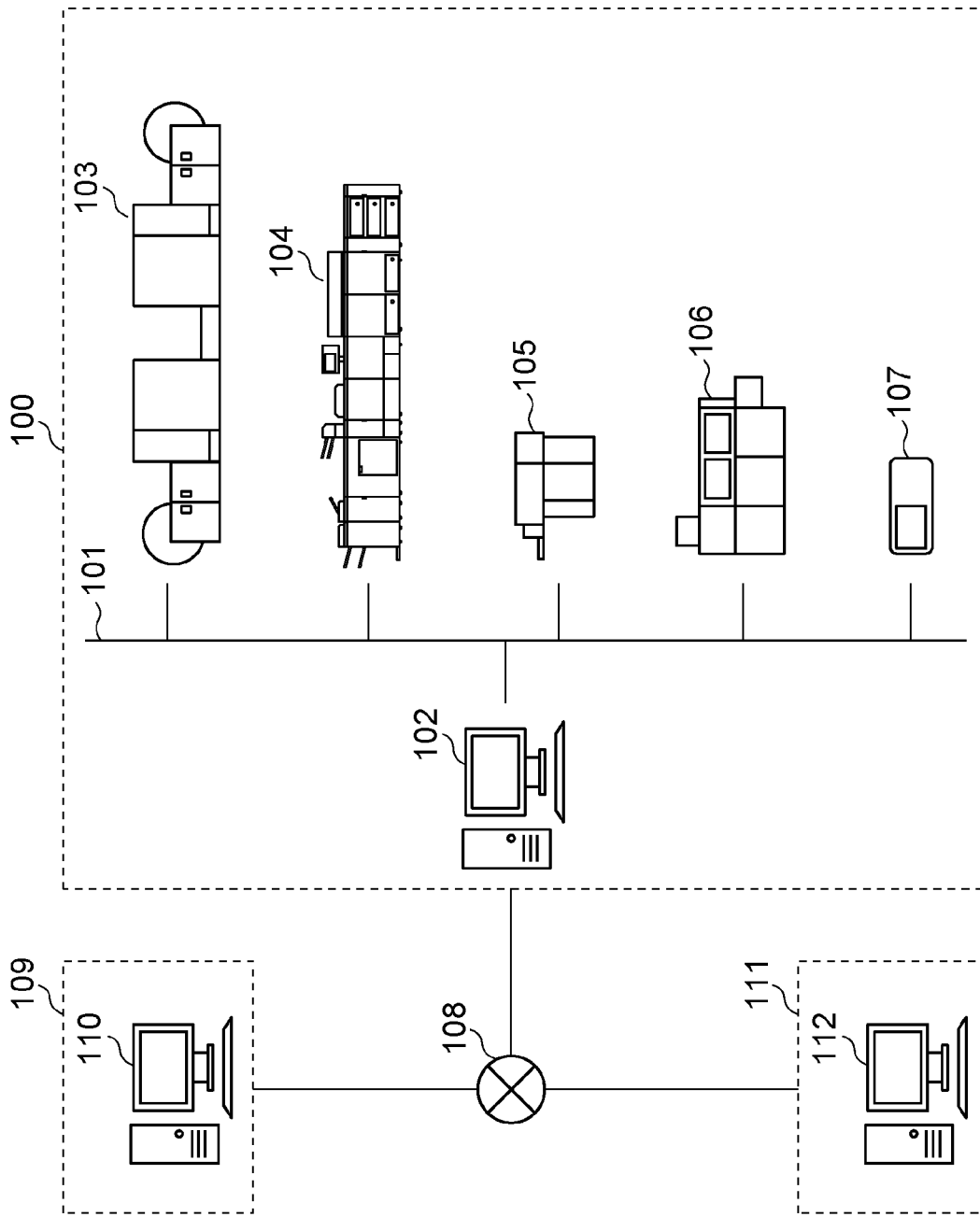
FIG. 1 is a block diagram showing an entire print processing system in a first embodiment.

FIG. 1 is a block diagram showing a system according to the present embodiment.

The system is broadly divided into a customer system 109, a printing company system 100, and a parent company system 111 of a printing company that are connected to one another by the Internet 108. The customer system 109 includes at least one or more information processing apparatuses 110. Similarly, the parent company system 111 also includes at least one or more information processing apparatuses 112.

Hereinafter, the internal configuration of the printing company system 100 will be described in detail. As shown in FIG. 1, a plurality of apparatuses is connected to one another by a network 101. As these apparatuses, an information processing apparatus 102, an image forming apparatus 103, an image forming apparatus 104, a laminator 105, a wireless binder 106, and a colorimeter 107 are connected. The image forming apparatus 103 is an image forming apparatus for continuous form sheets. The image forming apparatus 104 is an image forming apparatus for cut sheets. By using these apparatuses with different printing mechanisms, a printing company is able to produce a product requested from a customer in an optimal mode.

The apparatuses are controlled under command of work flow software that operates on the information processing apparatus 102, process job data submitted by the customer system 109, and produce a product. Job data submitted from the customer system 109 includes image data, job ticket, and quality requirements data. The job ticket has, for example, JDF format. The quality requirements data has, for example, PRX format. Furthermore, the information processing apparatus 102 in the printing company system 100 also has functions to receive notification of the above-described processing results of the apparatuses and to convert the processing results to quality report data and transmit the quality report data to the customer system 109. The format of quality report data is, for example, PQX format.

When a series of processes in which a customer transmits by PRX requirements on the quality of a product required of a printing company and the printing company reports the quality of a product produced to the customer by PQX is electronized, the following benefits are obtained.

Firstly, it is possible to obtain the effect of reducing the possibility of mutual erroneous recognition on product quality by quantitatively providing requirements on the quality of a product for which a customer makes a request of a printing company as has been performed in the past. Secondly, a printing company is able to electronically visualize the quality of a product produced, so a customer is able to immediately grasp the quality of a product requested for production. Thirdly, as the effect of electronization of requirements and a report on quality, even in production of a product over a long term, it is easy for a customer and a printing company to uniformize the quality even when time-series fluctuations in quality can occur. Fourthly, even when a customer makes a request of a plurality of printing companies for production, it is easy for the customer and the printing companies to uniformize the quality while visualizing variations in quality among the plurality of printing companies at the same time.

Figure 2:
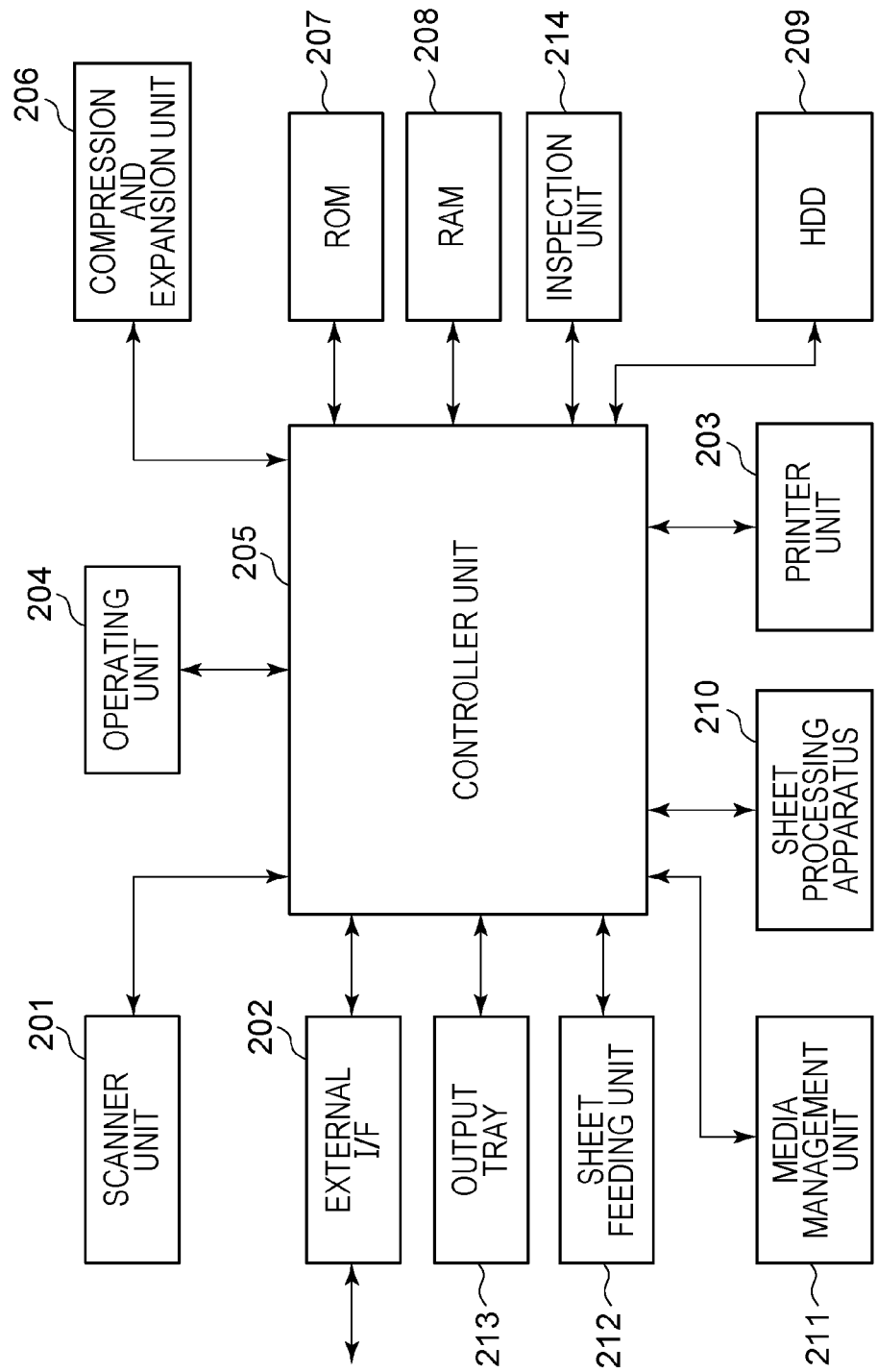
FIG. 2 is a hardware configuration diagram of an image forming apparatus in the first embodiment.

FIG. 2 is a diagram illustrating the hardware configuration of the image forming apparatus 104. The image forming apparatus 104 has a reading function to read an image on a sheet and a printing function to print an image on a sheet. The image forming apparatus 104 has a post-processing function to bind a plurality of sheets on which images are printed, to align a plurality of sheets, and to separately discharge a plurality of sheets to a plurality of trays. Sheets include paper, such as plain paper and thick paper, film sheet, and the like.

The image forming apparatus 104 shown in the drawing is configured such that a plurality of apparatuses having different roles are coupled to one another and complex sheet processing is possible. The image forming apparatus 104 is an apparatus used to convey a piece of media stored in a sheet feeding unit 212 and form an image onto the piece of media by using toner in accordance with expanded image data. The image forming apparatus 104 includes a scanner unit 201 and an operating unit 204. The operating unit 204 provides various interfaces in the case where an operator performs various settings, operations, and the like of the image forming apparatus 104. The image forming apparatus 104 in the present embodiment is configured such that various associated apparatuses are able to be attached. In the present embodiment, a sheet processing apparatus 210 is described as an example of the associated apparatus. The sheet processing apparatus 210 is an apparatus for obtaining a product obtained by applying various types of processing to a piece of media after an image is formed by a printer unit 203.

An output tray 213 discharges an output product processed by the sheet processing apparatus 210 and forms a tray unit for loading. An inspection unit 214 is a module provided to inspect image information formed on a sheet by the printer unit 203. Targets to be inspected include a print position misalignment amount (registration misalignment amount) of each of prints of CMYK and a difference (color difference) between a color with which an image is formed by combining the prints of CMYK and a color specified by print data. Furthermore, targets to be inspected include the reading accuracy of a barcode part included in an image formed, and image defects, such as a rubbed area and a scratch, on an image. The module has a function to optically read an image on a sheet after image formation for these defects of the image and to convert the defects to inspection result data. A hard disk drive 209 (hereinafter, also referred to as HDD) is a non-volatile memory and stores a plurality of pieces of job data to be processed, various pieces of management information, and the like.

Job data received from the scanner unit 201 is printed by the printer unit 203 via the HDD 209. Job data received from an external apparatus via an external I/F 202 corresponding to an example of a communication unit is printed by the printer unit 203 via the HDD 209. The external I/F 202 transmits and receives image data to and from a facsimile, a network connection device, and an external dedicated apparatus. The operating unit 204 corresponds to a user interface unit and has a display unit here.

The controller unit 205 (also referred to as control unit or CPU) generally controls the processes, operations, and the like of various units provided in the image forming apparatus 104. The ROM 207 stores various control programs to be used in the present embodiment, including a program for executing various processes and the like of a flowchart (described later). The ROM 207 also stores a display control program for causing the display unit of the operating unit 204, including a user interface screen (hereinafter, referred to as UI screen), to display various UI screens. The controller unit 205 causes the image forming apparatus 104 to execute various operations described in the present embodiment by reading and running programs in the ROM 207. A program for interpreting code data forming print data, such as PDF, received from an external apparatus via the external I/F 202 and expanding the code data into raster image data (bitmap image data) is also stored in the ROM 207. A program for interpreting a print job received from an external apparatus via the external I/F 202 and processing the print job is also stored in the ROM 207. These are processed mainly by software. The details of various programs stored in the ROM 207 will be described later. The HDD 209 (hard disk drive) is a large-capacity storage device that stores image data compressed by a compression and expansion unit 206. The HDD 209 is configured to be capable of holding a plurality of pieces of data, such as print data of a job to be processed. The controller unit 205 controls data of a job to be processed, input via various input units including the scanner unit 201, the external I/F 202, and the like such that the data can be printed by the printer unit 203 via the HDD 209. The controller unit 205 also controls data of a job to be processed such that the data can be transmitted to an external apparatus via the external I/F 202. In this way, the controller unit 205 controls data of a job to be processed, stored in the HDD 209, such that various output processes for the data can be executed. Furthermore, the controller unit 205 is configured to be capable of implementing functions of file sharing, file transmission and reception, and the like of a file system constructed in the HDD 209 for an external apparatus by reading and running programs in the ROM 207. The compression and expansion unit 206 performs compression and expansion operation on image data and the like stored in the RAM 208 or the HDD 209 in accordance with various compression formats, such as JBIG and JPEG. With the above-described configuration, the controller unit 205 serving as an example of the control unit of the printing system also controls the operations of each sheet processing apparatus 210. A media management unit 211 is a module for managing information on media species. The inspection unit 214 is a module provided to inspect image information formed on a sheet under control of the controller unit 205 over the modules that make up the image forming apparatus 104 shown in the drawing. Inspection result information converted to inspection result data by the module is transmitted to the information processing apparatus 102 via the external I/F 202.

Figure 3:
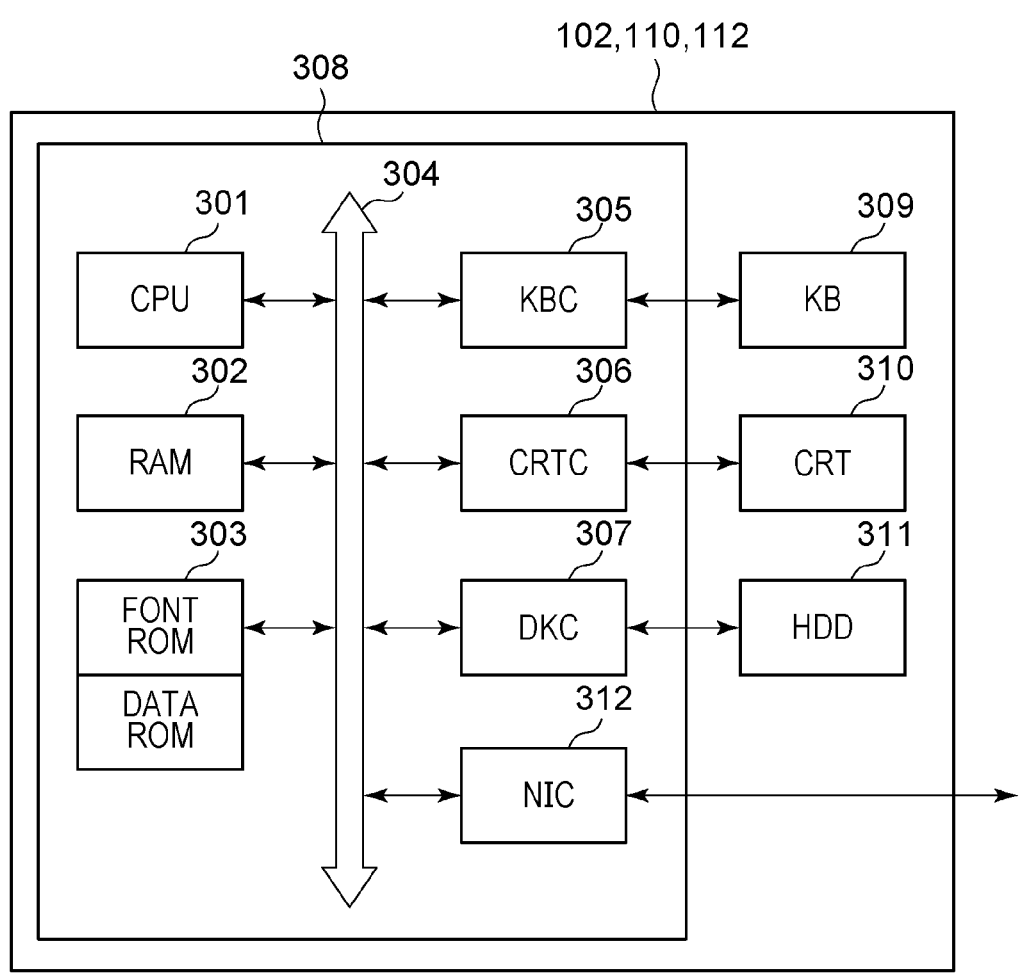
FIG. 3 is a hardware configuration diagram of an information processing apparatus in the first embodiment.

FIG. 3 is a block diagram showing the configuration of each of the information processing apparatuses 102, 110, 112.

In the drawing, the CPU 301 runs an OS and general application programs stored in a program ROM of the ROM 303 or loaded from the HDD 311 to the RAM 302. The ROM 303 has a font ROM and a data ROM. The RAM 302 functions as a main memory, a work area, and the like of the CPU 301. A keyboard controller (KBC) 305 controls entry from a keyboard or a pointing device (not shown). A display controller (CRTC) 306 controls display on a display unit (CRT) 310. A disk controller (DKC) 307 controls access to the HDD 311 and the like that store a boot program, various applications, font data, and the like. A network controller (NIC) 312 is connected to a network and executes a communication control process with another device connected to the network. A bus 304 connects the CPU 301 to the RAM 302, the ROM 303, various controllers, and the like and carries data signals and control signals.

In the case of a mobile terminal, a touch panel controller or the like may be included in the configuration instead of the keyboard controller (KBC) 305. A large-capacity storage device that substitutes for the HDD 311 may be provided. Furthermore, the network controller (NIC) 312 has a different internal configuration among a case where the host apparatus includes a wired LAN, a case where the host apparatus includes a wireless LAN, and a case where the host apparatus includes both. However, these differences in internal configuration are hidden inside the network controller (NIC) 312, and those internal configurations are configured so as to be capable of controlling the system as equivalent ones for the other modules shown in the drawing.

Figure 4:
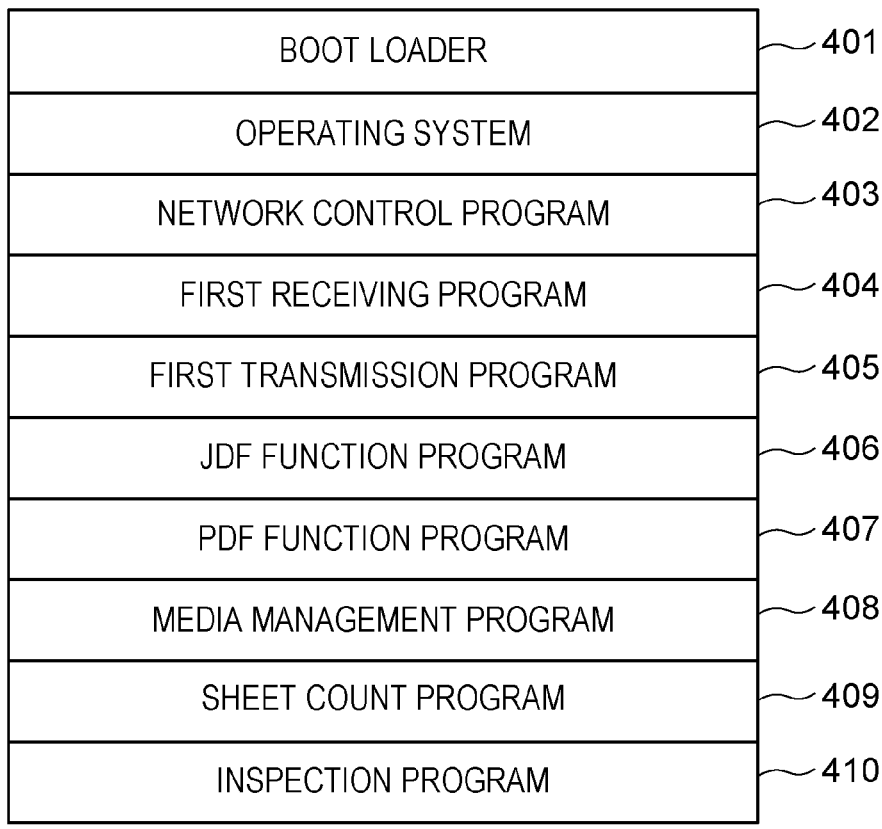
FIG. 4 is a software configuration diagram of the image forming apparatus in the first embodiment.

FIG. 4 is a diagram illustrating programs of the image forming apparatus 104. These programs are stored in the ROM 207 and are read and run by the controller unit 205 of the image forming apparatus 104.

A boot loader 401 is a program that is run just after the power of the image forming apparatus 104 is turned on. The programs include a program for executing various boot sequences needed to boot the system. An operating system 402 is a program intended to provide an environment to run various programs that implement the functions of the image forming apparatus 104. This provides functions of recourses management for mainly the memory of the image forming apparatus 104, that is, the ROM 207, the RAM 208, HDD 209, and the like and basic input/output control and the like of the other units shown in FIG. 2.

A network control program 403 is a program that is run when data is transmitted and received to and from devices connected via the network. The program is used when various processes, such as a process of receiving a file to be printed, data transmission from an external apparatus, transmission and reception of a command, and transmission of digital data generated as a result of inspection performed by the inspection unit 214. The network control program includes a driver program for controlling the external I/F 202. A first receiving program 404 is a program for receiving various instructions and information from the information processing apparatus 102. Information and instructions to be received by the program include designation of image information to be inspected by the inspection unit 214. A first transmission program 405 is a program for transmitting information to the information processing apparatus 102. Information to be transmitted by the program includes inspection result data generated as a result of inspection performed by the inspection unit 214. A JDF function program 406 is a program that, when JDF job data is received by the image forming apparatus 104 via the external I/F 202, executes a JDF print function that is executed by the controller unit 205 in response to an instruction from the external I/F 202. With the JDF print function, the controller unit 205 sequentially provides an instruction for the operation of each of the devices shown in FIG. 2 in appropriate order in accordance with processing order and processing conditions described in the program. As a result, the devices are controlled such that the JDF print process is eventually executed. The devices include the sheet processing apparatus 210, the printer unit 203, the HDD 209, the compression and expansion unit 206, the RAM 208, and the like. The JDF print process also includes a process of analyzing JDF job data received via the external I/F 202, a process of determining whether an incorrect setting is included in JDF as a result of the analyzing process, and a program process of making setting changes and the like for resolving the incorrect setting.

When PDF data (print target image data) is received by the image forming apparatus 104 via the external I/F 202, a PDF function program 407 executes a process of expanding the PDF data, and a print function, executed by the controller unit 205. With the PDF function executed by the controller unit 205, the controller unit 205 sequentially provides an instruction for the operation of each of the devices shown in FIG. 2 in appropriate order in accordance with the processing order and processing conditions described in the program. As a result, the devices are controlled such that the PDL print process is eventually executed. The devices include the sheet processing apparatus 210, the printer unit 203, the HDD 209, the compression and expansion unit 206, the RAM 208, and the like. The PDF function program in the present embodiment is configured to operate together with the JDF function program 406 as various designation at the time of executing a print process. A media management program 408 is a program for executing a management function related to sheets available to the image forming apparatus 104. Sheet-related information managed by the program is stored in the HDD 209.

A sheet count program 409 is a program for accumulating, managing, and storing the number of sheets used for printing at the time of forming an image by the printer unit 203 on sheets stored in the sheet feeding unit 212 of the image forming apparatus 104 in association with sheet size information.

An inspection program 410 is a program for controlling the inspection unit 214, inspecting an output result image, and generating inspection result data. Inspection result data generated by the program is transmitted to the information processing apparatus 102 by the first transmission program 405.

Figure 5:
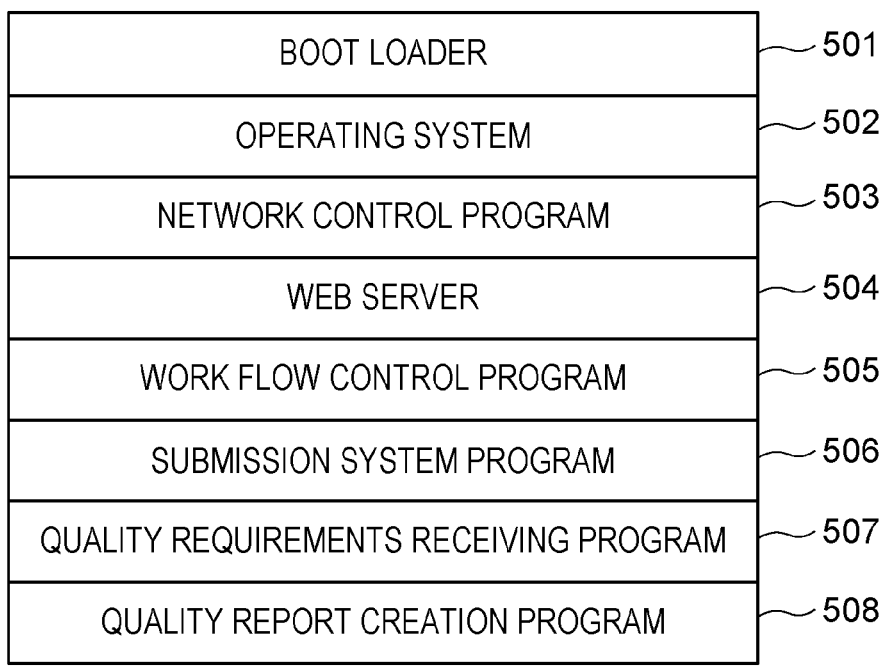
FIG. 5 is a software configuration diagram of the information processing apparatus of a printing company system in the first embodiment.

FIG. 5 is a diagram illustrating the configuration of programs installed in the information processing apparatus 102 in the printing company system 100.

A boot loader 501 is a program that is run just after the power of the information processing apparatus 102 is turned on. These programs include a program for executing various boot sequences needed to boot the system. An operating system 502 is a program intended to provide an environment to run various programs that implement the functions of the information processing apparatus 102. This provides functions of resources management and the like for the memory of the information processing apparatus, that is, the ROM 303, the RAM 302, the HDD 311, and the like. A network control program 503 is a program that is run when data is transmitted and received to and from devices connected via the network. In other words, the network control program 503 is used at the time of transmitting print job data to the image forming apparatus (103, 104) and providing an instruction for a print process. The network control program 503 is also used at the time of providing an instruction to the laminator 105 to apply a decorating process to a printed product. The network control program 503 is also used at the time of providing an instruction to the wireless binder 106 to perform post-processing on a product. The network control program 503 is also used at the time of providing an instruction to the image forming apparatus (103, 104) to perform inspection with the inspection unit 214. The network control program 503 is also used at the time of receiving quality report data from the inspection unit 214 via the first transmission program 405. A web server 504 is a server program for allowing an external device connected via a network to use web services. Various services provided by the web server 504 are conceivable. However, the present embodiment describes an example in the case where the service is provided as a means at the time of submitting data to be ordered from the customer system 109 to the printing company system 100. In addition, an example in which the service is provided as a means of acquiring PQX information that is a quality report for determining whether quality requirements set for a printing company by a customer at the time of submission are achieved is described.

A work flow control program 505 is a program for centrally managing processes, control, job execution, and the like among devices connected via the network 101 inside the printing company system 100 and forms the heart of the printing company system 100. At the time of manufacturing a product by using a plurality of steps, that is, a plurality of apparatuses, the work flow control program 505, for example, controls the order of execution and executes jobs. The work flow control program 505 also controls selection, switching, recovery production, and the like of an apparatus to be used. The work flow control program 505 also executes a process of providing various instructions to operators working inside the printing company system 100. Furthermore, an example of a mode in which the work flow control program 505 according to the present embodiment also provides a PQX creation means that receives measured data on the quality of a print image from the inspection unit 214 of the image forming apparatus 104 and converts the measured data into a PQX format is described. A submission system program 506 is software that mainly has a role in holding and managing data for which a request for production is received from the customer system 109 in the printing company system 100. The submission system program 506 is a system that cooperates with the web server 504 and that is used to electronically execute various functions needed for order placement and reception work, for example, a series of processes including transmission of data, issuance of an invoice, and the like, between the customer system 109 and the printing company system 100. A selected communication specification is used between the customer system 109 and the printing company system 100, and a system supporting PrintTalk as a standard specification is widely known. A quality requirements receiving program 507 is a program provided to receive PRX that is quality requirements data out of data submitted from the customer system 109. When the program receives PRX, the program analyzes the details and sets instructions, conditions, and the like for creating a product with quality required by a customer to apparatuses in the printing company system 100 as needed. Or the program provides information needed for an operator.

In the present embodiment, the example in which, when the printing company system 100 receives quality requirements data from the customer system 109, the printing company system 100 receives quality requirements data via the web server 504, and the quality requirements receiving program receives the received data has been described. However, as another mode, the quality requirements receiving program itself may directly receive quality requirements data from the customer system 109. Or the quality requirements receiving program 507 may take a mode of operating on the web server 504 as a web content.

A quality report creation program 508 is a program for transmitting or acquiring PQX that is quality report data. With quality report data, it is possible to determine whether a printing company has performed quality conditions designated by PRX that is the quality requirements data during production.

Inspection result data is received from the image forming apparatus 103, the image forming apparatus 104, or another apparatus in a printing company and accumulated, and converted to data in PQX format at appropriate timing, and the customer system 109 is configured to be able to receive PQX via a communication means. In the present embodiment, when the customer system 109 receives quality report data from the printing company system 100, the customer system 109 receives a request via the web server 504. The customer system 109 transmits quality report data as a response to the received request via the quality report creation program 508. However, as another mode, the quality report creation program 507 itself may directly transmit quality report data to the customer system 109. Or the quality report creation program 507 may take a mode of operating on the web server 504 as a web content.

Figure 6:
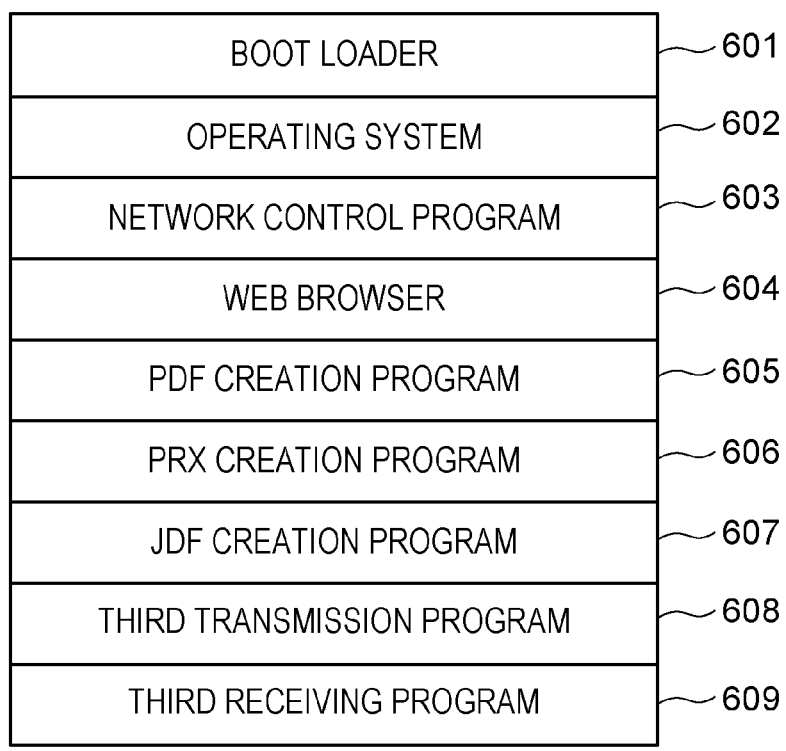
FIG. 6 is a software configuration diagram of the information processing apparatus of a customer system in the first embodiment.

FIG. 6 is a diagram illustrating the configuration of programs installed in the information processing apparatus 110 in the customer system 109.

A boot loader 601 is a program that is run just after the power of the information processing apparatus 110 is turned on. These programs include a program for executing various boot sequences needed to boot the system. An operating system 602 is a program intended to provide an environment to run various programs that implement the functions of the information processing apparatus 110. This provides functions of resources management and the like for the memory of the information processing apparatus, that is, the ROM 303, the RAM 302, the HDD 311, and the like. A network control program 603 is a program that is run when data is transmitted and received to and from apparatuses connected via the network. In other words, the network control program 603 is used at the time of, for example, performing transmission and reception of data to and from the printing company system 100 via the Internet 108. The network control program 603 is also used in a rendering display process and a data transmission and reception process using a web browser (described later).

The web browser 604 is a client program for using a web service provided by an external system connected via a network. Various services used by the web browser 604 are conceivable. In the present embodiment, the web browser 604 is used as a means at the time of making a request of the printing company system 100 to receive submission data that is a target to be ordered. In addition, the web browser 604 is also used as a means of acquiring PQX information that is a quality report for determining whether quality requirements set for a printing company by a customer at the time of submission is achieved. A PDF creation program 605 is a program that creates image data in PDF format, which is a target that the customer system 109 makes a request of the printing company system 100 to produce. In the present embodiment, the example in which PDF format is used as the format of image data is described; however, a mode of another format may be used. Creation of PDF data also includes a process of, for example, adding an image to already-existing image data in PDF format. A PRX creation program 606 is a program for, at the time when the customer system 109 makes a request of the printing company system 100 to produce, creating information for transmitting quality requirements on a product to be generated in PRX format. Specific details of quality requirements designated by the program, its setting method, and the created data format will be described later. A JDF creation program 607 is a program for, at the time when the customer system 109 makes a request of the printing company system 100 for production, creating information for transmitting a form of a product to be produced, job execution conditions during production, job settings, and the like in JDF format. Specific details of setting information designated by the program, its setting method, and the created data format will be described later.

A third transmission program 608 is a program used to transmit quality requirements data in PRX format, created by the PRX creation program 606, from the customer system 109 to the printing company system 100. A third receiving program 609 is a program for the customer system 109 to receive quality report data, created by the quality report creation program 508 in the printing company system 100, from the printing company system 100.

Figure 7:
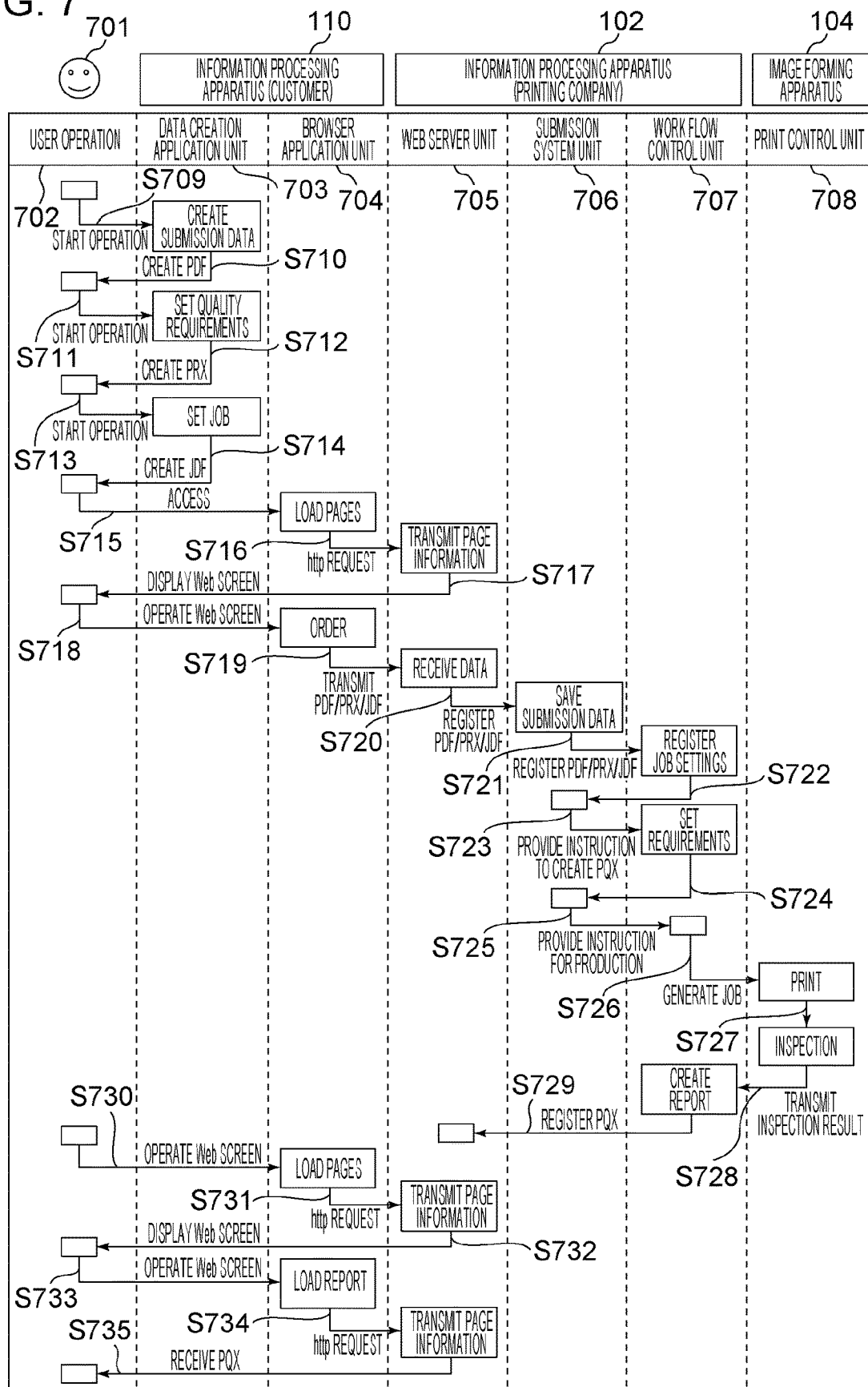
FIG. 7 is a system flow for illustrating a process flow of the entire print processing system in the first embodiment.

FIG. 7 is a system flowchart at the time when the customer system 109, the printing company system 100, and a customer that is an operator of them, that is, a user, uses functions provided by the systems. A user 701 represents a user of the information processing apparatus 110 in the customer system 109.

Hereinafter, the flow of control transmitted and received among the systems in the course of user operation 702 to be performed at the time when the functions provided by the system are provided to the user 701 in each of the systems of the user 701, the information processing apparatuses 110, 102, and the image forming apparatus 104 will be described. However, when a plurality of subsystems needs to perform processing while interacting with each other in each of the systems, the flow will be described at the level of those subsystems.

The subsystem of the user 701 is the user operation 702. This is a field showing the details of operation for instruction on the screen, the results of the operation, and related flow to occur in order for a user to implement a series of flows shown in the drawing.

The information processing apparatus 110 of the customer system 109 is separated into two subsystems. In other words, those are two subsystems shown as a data creation application unit 703 and a browser application unit 704. The data creation application unit 703 is implemented by the CPU 301 running the PDF creation program 605, the PRX creation program 606, and the JDF creation program 607. The browser application unit 704 is implemented by the CPU 301 running the web browser 604. The information processing apparatus 102 of the printing company system 100 is separated into three subsystems. In other words, those are three subsystems shown as a web server unit 705, a submission system unit 706, and a work flow control unit 707.

The web server unit 705 is implemented by the CPU 301 running the web server 504. The submission system unit 706 is implemented by the CPU 301 running the submission system program 506. The work flow control unit 707 is implemented by the CPU 301 running the work flow control program 505.

In S709, the user 701 provides an instruction to create data to be ordered to the printing company system 100. Specifically, the PDF creation program 605 receives operation resulting from the instruction of the step, and various processes for creating desired PDF image data are executed. After creation of desired PDF image data is complete in S710, the user 701 further provides an instruction to create quality requirements data on a product to be ordered to the printing company system 100 in S711. Specifically, the PRX creation program 606 receives operation resulting from the instruction of the step, and various processes for creating desired PRX data are executed. After creation of desired PRX data is complete in S712, the user 701 further provides an instruction to create job ticket on a product to be ordered to the printing company system 100 in S713. Specifically, the JDF creation program 607 receives operation resulting from the instruction of the step, and various processes for creating desired JDF data are executed. At the stage at which creation of desired JDF data is complete in S714, creation of all the data to be submitted to a printing company completes, so the process proceeds next to a process of submitting data to the printing company.

In S715, the user operates the browser application unit 704 and performs operation needed to display an operation screen for submitting data to the printing company. In other words, the browser application unit 704 outputs in S716 an http request needed for a rendering process to the web server unit 705 that operates on the printing company-side information processing apparatus 102 in accordance with URL information input in S715. The web server unit 705 receives a request and returns page information in S717 as a response.

The user 701 operates the submission screen displayed in S718 and provides an instruction to execute an ordering process on the browser application unit 704. In response to the process of S718, the browser application unit 704 transmits various pieces of data, that is, PDF, PRX, and JDF, that is, submission data, to the web server unit 705 in S719. When the web server unit 705 receives submission data, the web server unit 705 executes a process of storing the pieces of submission data in the submission system unit 706 in S720.

S721 and the following steps are steps of a production process to be executed in the printing company system 100 for the submitted data. In other words, job data is registered in the work flow control unit 707 in accordance with the submission data, and a print job is generated in the printing company system 100. In the system according to the present embodiment, it is necessary to create and transmit PQX that is a quality report corresponding to designated PRX. Therefore, after the process of registering a job ends in S722, the submission system unit 706 provides a PQX creation instruction to the work flow control unit 707.

All the preparations for the start of production are completed at the stage at which the above step ends (S724). Therefore, in S725, the submission system unit 706 provides an instruction to start production, that is, a process of executing a job, to the work flow control unit 707. The work flow control unit 707 generates a print job for a print control unit 708 that is a component of the image forming apparatus 104 (S726). The print job includes print data, parameters used by the print control unit 708 for printing, and information on a parameter used to measure quality, such as colorimetric position. In the present embodiment, the print control unit 708 analyzes PDF, so print data transferred to the print control unit 708 in S726 remains in PDF format, and a parameter indicating a colorimetric position is the value of the Id of an object of PDF. Upon receiving the instruction of S726, the print control unit 708 starts a print process. Then, in S727, the inspection unit 214 of the image forming apparatus 104 performs inspection on the produced product. The inspection result is returned to the work flow control unit 707 in S728, the work flow control unit 707 converts the returned inspection result into PQX format and stores the inspection result in the web server unit 705.

This is a series of operation flows related to production by the printing company system 100 for data submitted from the customer system 109 and a process of creating PQX that is the required quality report information.

In S730, the user 701 executes a process of acquiring PQX data to check a quality situation during production for submitted data. In other words, the user 701 accesses the browser application unit 704 and inputs information, such as necessary URL, to acquire PQX information. In S731, an http request is transmitted from the browser application unit 704 to the web server unit 705, and corresponding response information is returned in S732. In S733, the user operates the web screen returned in S732 and provides an instruction to the browser application unit 704 to acquire quality report information, that is, PQX. An http request is transmitted to the web server unit 705 (S734), and PQX information is transmitted to the user as its response.

Figure 8:
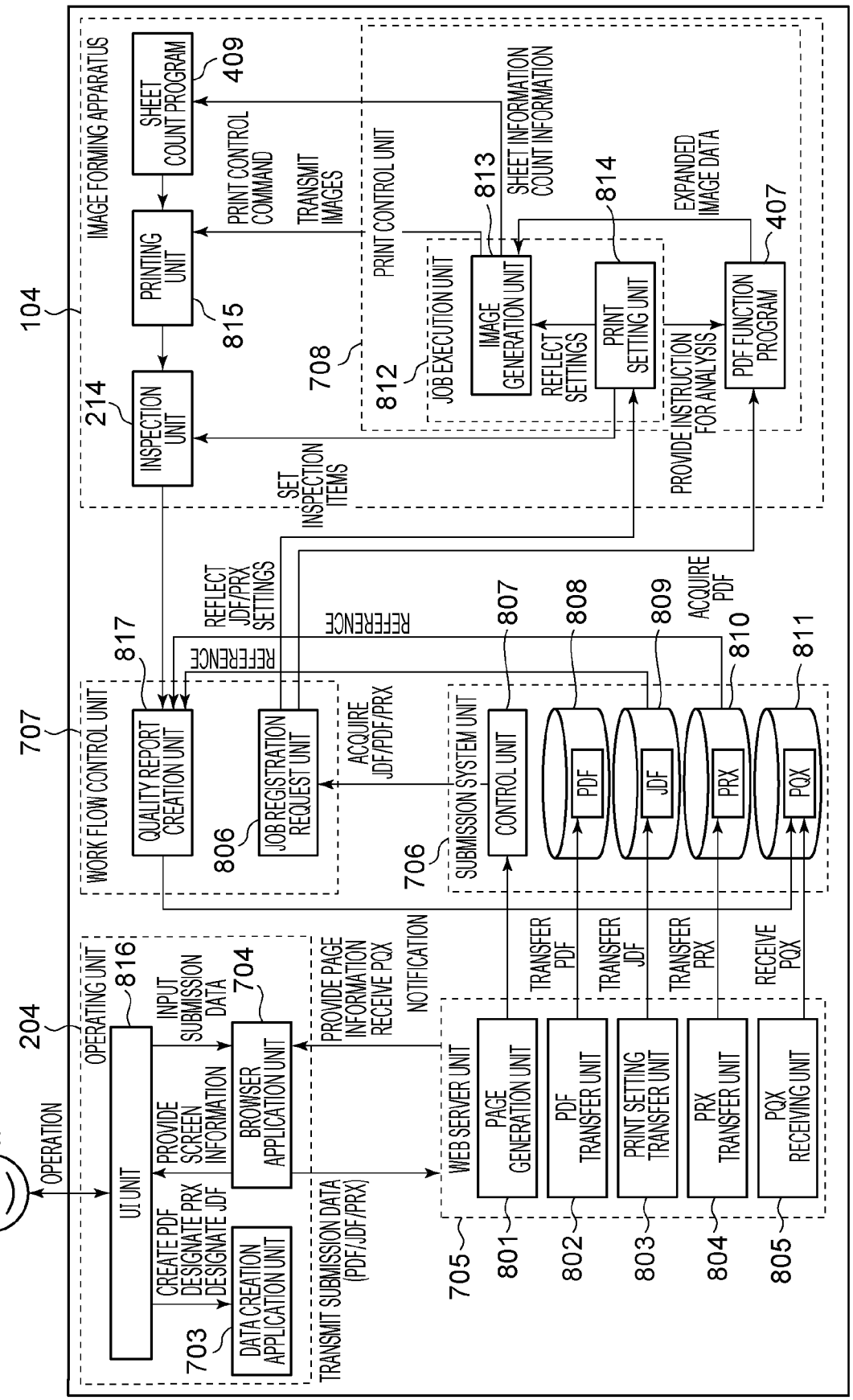
FIG. 8 is a detailed block diagram illustrating a detailed system configuration of the entire print processing system in the first embodiment.

FIG. 8 is a system configuration diagram showing a relationship among processes in charge and functions of functional modules made up of the customer system 109 and the printing company system 100 that make up the system and the user 701 that is the operator. Hereinafter, the details of the units will be described.

A UI unit 816 is a functional unit provided to provide a means of displaying image information and receiving a data input and output instruction and an operation instruction. An instruction is provided from the UI unit 816 to the data creation application unit 703 and the browser application unit 704.

The data creation application unit 703 is to provide the user with a function to create pieces of data of JDF, PDF, and PRX. The browser application unit 704 is a functional unit that governs a process of presenting screen information by displaying a web content on a window screen displayed on the UI unit 816. The browser application unit 704 executes a process of transmitting and receiving information to and from the web server unit 705 (described later). By executing various data processing, including presentation of various pieces of screen information and transmission of print target data, a series of functions of submission and quality requirements and report between the customer system 109 and the printing company system 100 is provided to the user.

The web server unit 705 is a functional unit of the information processing apparatus 102 in the printing company system 100 and is a functional unit that provides a web service to an external apparatus. The web server unit 705 executes a series of processes of receiving various requests from an external apparatus, that is, a request, and returning a result of executing a process according to the details to the outside in form of page information. A page generation unit 801 has a role in generating page information in accordance with the details of a request. It is also possible to provide an instruction to execute a submission process to the control unit 807 of the submission system unit 706. A PDF transfer unit 802, a print setting transfer unit 803, and a PRX transfer unit 804 respectively execute a process of transferring PDF, JDF, PRX that are submission data transmitted from the browser application unit to storage means (808, 809, 810) provided by the submission system unit 706. A PRX receiving unit 805 executes a process of receiving PRX data (811) created by a quality report creation unit 817 (described later).

The submission system unit 706 is a functional unit of the information processing apparatus 102 in the printing company system 100 and is a functional unit that provides an external apparatus with a service related to a submission process. The control unit 807 provides a request of a job registration request unit 806 of the work flow control unit 707 for pieces of submitted data and provides an instruction to execute a print job to the image forming apparatus 104. The work flow control unit 707 is a functional unit of the information processing apparatus 102 in the printing company system 100 and is a functional unit for providing a work flow function. Under command of the work flow control unit 707, various apparatuses shown in FIG. 1 are connected via the network 101, and, under command of the work flow control unit 707, the operation of each of the apparatuses, an instruction to execute a job, and the like are performed, and the printing company system 100 operates as an integrated whole. There are execution results of jobs having operated on the work flow control unit 707, the job registration request unit 806 that manages jobs that operate on the apparatuses in the printing company system 100, and the apparatuses in the printing company system. The work flow control unit 707 includes a quality report creation unit 817 that generates PQX data that is quality report information from information on the quality of a produced product out of these execution results. The image forming apparatus 104 is roughly divided into the print control unit 708, the sheet count program 409, a printing unit 815, and the inspection unit 214.

The print control unit further includes a job execution unit 812 and the PDF function program 407. The job execution unit is made up of an image generating unit 813 and a print setting unit 814. The print setting unit receives job data, that is, JDF 809, PDF 808, and PRX, transmitted from the job registration request unit 806 and provides an instruction for an image generating process to the image generating unit 813. The print setting unit also provides an instruction for a process of analyzing the received PDF 808 to the PDF function program 407. The print setting unit 814 provides an instruction to the inspection unit 214 to perform inspection for quality requirements items of the PRX 810 required for a product produced. The PDF function program 407 transmits intermediate data (not shown) generated after analysis to the image generating unit 813 and executes the following image forming process. In other words, the image generating unit 813 provides an instruction for the size and count by type of sheets used in a print process to the sheet count program 409, and executes a process of forming an image of intermediate data (not shown) generated after analysis on the printing unit 815. The inspection unit 214 executes a process of inspecting an image generated on a sheet by the printing unit 815 and registers the result in the quality report creation unit 817.

Figure 9A:
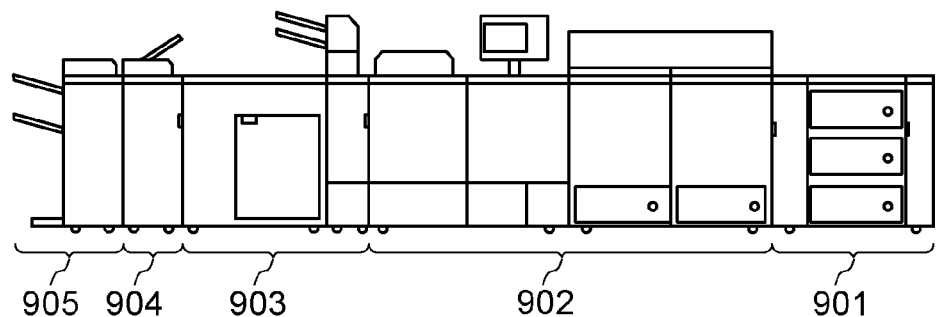
FIG. 9A is a view for illustrating the configuration and operation mechanism of an inspection apparatus of the image forming apparatus in the first embodiment.
Figure 9B:
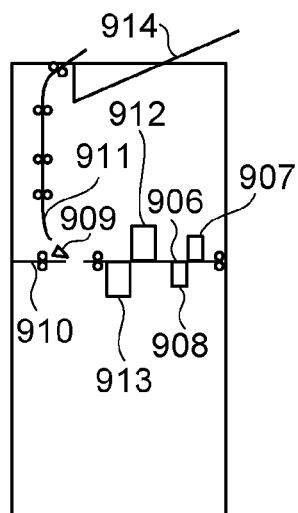
FIG. 9B is a view for illustrating the configuration and operation mechanism of the inspection apparatus of the image forming apparatus in the first embodiment.
Figure 9C:
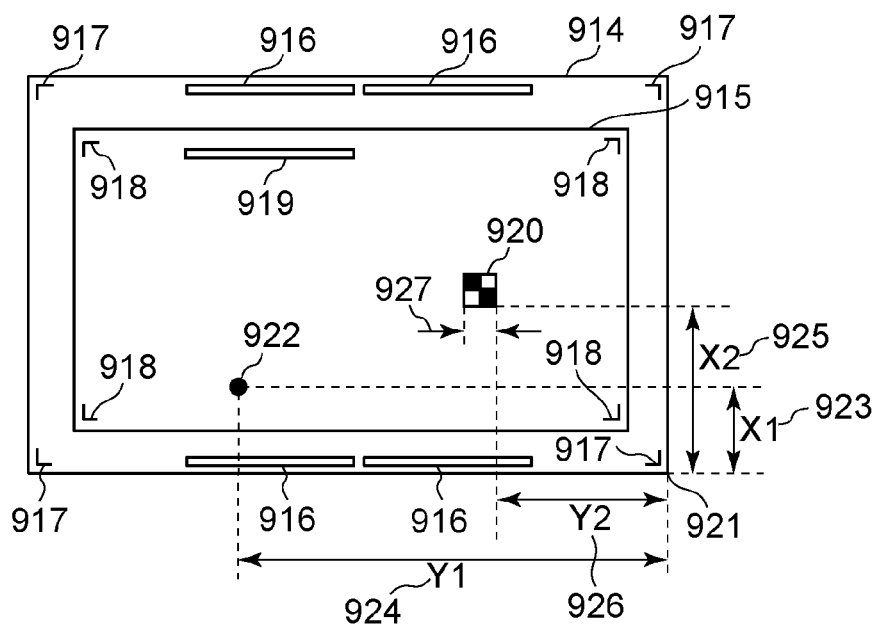
FIG. 9C is a view for illustrating the configuration and operation mechanism of the inspection apparatus of the image forming apparatus in the first embodiment.

FIGS. 9A to 9C are views for illustrating the configuration of an inspection apparatus and a method and mechanism of inspection performed by the inspection apparatus in the configuration of the image forming apparatus 104.

FIG. 9A is a configuration view for illustrating the arrangement of modules making up the image forming apparatus 104, the connection, and the order relation of sheet conveying path. A sheet feeding unit 901 is installed in a form adjacent to the image forming unit 902. An intermediate processing unit 903 is connected in a form adjacent to the side across from the sheet feeding unit 901. For example, an inserter used to insert insertion paper to a specific location of a product during production, a cooling apparatus for cooling heat on a sheet, generated at the time when a fixing process is performed in the image forming unit 902, and the like correspond to the intermediate processing unit 903 An inspection unit 904 is installed downstream of the intermediate processing unit 903. The details of the configuration of the inspection unit 904 will be described later.

A post-processing unit 905 is further installed on the downstream end of the inspection unit 904. In the post-processing unit 905, printed sheets are subjected to processing, including a binding process, such as stapling, a perforating process, such as punching, and the like. One example of the type, number, and connection order of constituent apparatuses that make up the image forming apparatus 104 shown in the drawing is shown; however, the configuration is not limited to the example shown in the drawing.

FIG. 9B is a configuration view for showing the internal configuration of the inspection unit 904. A printed sheet is conveyed from an apparatus corresponding to the one upstream of the inspection unit 904 to a conveying path 906. A first inspection unit 907 and a second inspection unit 908 for inspecting image information formed on a conveyed sheet are respectively placed above and below the sheet. This is a configuration to inspect images respectively formed on the front and back surfaces of a sheet at the same time. The first inspection unit 907 and the second inspection unit 908 in the present embodiment each are made up of a contact image sensor placed parallel to a main scanning direction for a sheet conveyed to the conveying path 906. Each of the first inspection unit 907 and the second inspection unit 908 each made up of the contact image sensor continuously reads an image on the sheet conveyed to the conveying path 906 in the main scanning direction in step with the conveying speed of the sheet and highly accurately acquires planar image information formed on a sheet. In other words, the first inspection unit 907 and the second inspection unit 908 are capable of detecting defects of an image, such as misregistration of an image and a stain, of image information formed on a sheet, and inspecting an image, such as the reading accuracy of a barcode.

A third inspection unit 912 and a fourth inspection unit 913 are further placed in the conveying path 906 downstream of the first inspection unit 907 and the second inspection unit 908. The third inspection unit 912 and the fourth inspection unit 913 each are a spectrophotometric colorimetry apparatus. The third inspection unit 912 and the fourth inspection unit 913, as well as the first inspection unit 907 and the second inspection unit 908, are respectively placed above and below the conveying path 906 so as to be capable of detecting the front and back surfaces of a sheet at the same time. The third inspection unit 912 and the fourth inspection unit 913 are intended to accurately inspect color information of an image at a specific point on a sheet conveyed to the conveying path 906.

A sheet having passed through the first to fourth inspection units (907, 908, 912, 913) is further conveyed in the following two-way directions depending on the position of a flapper 909. In other words, a sheet passes through a conveying path 910 and further conveyed to the post-processing unit 905 corresponding to a portion on the downstream end of the inspection unit 904. Alternatively, when a conveyed sheet is not part of a product but a sheet of collateral test print intended to check tint and an image condition, it is not a good idea to mix the sheet with a product. Therefore, the inspection unit 904 is also capable of controlling the position of the flapper 909 such that a sheet is conveyed to a conveying path 911 and guided to a discharge tray 914.

FIG. 9C is a view for illustrating an example of image information on a sheet used for inspection performed by the first to fourth inspection units (907, 908, 912, 913) of the inspection unit 904. Usages and purposes of image elements formed on a sheet will be described below.

Registration marks 917 are markers for inspecting whether an image is properly formed in a designated position on a sheet. This image information is read by the first inspection unit 907 and the second inspection unit 908. Even when registration marks 917 are not included as image information 915 of PDF data submitted by PRX, the image forming apparatus 104 is capable of forming an image by superposing registration marks on PDF data. Alternatively, registration marks can be included as image information in advance in submitted PDF data as in the case of second registration marks 918, and, in this case, the first inspection unit 907 and the second inspection unit 908 are capable of reading the registration marks 918 included in PDF data.

Color patches 916 are patch image parts for highly accurately reading color information at those points for an image at a designated position on a sheet with the third inspection unit 912 and the fourth inspection unit 913. Even when color patches 916, as in the case of the registration marks 917, are not included as image information 915 of PDF data submitted by PRX to the image forming apparatus 104, the image forming apparatus 104 is capable of forming an image by superposing registration marks on PDF data. It is also possible to perform colorimetry by reading an object, such as an image, included in PDF data. In this case, a color patch, as in the case of a second color patch 919, may be included as image information in advance in submitted PDF data, and not a color patch but an image of a product itself may be used as a target subjected to colorimetry. In the inspection unit 904, when the position of an image to be inspected is designated by coordinates, the third inspection unit 912 and the fourth inspection unit 913 are able to read a printed part of an object to be measured.

An image defect 922 is not included in image information 915 of submitted PDF data and represents a defective image part produced by a defect of the image forming apparatus 104 or a sheet. The image defect 922 is also able to be detected by the first inspection unit 907 and the second inspection unit 908, and the position of a detected defect is able to be acquired as relative coordinates (X1 (923), Y1 (924)) from the origin 921.

Figure 10A:
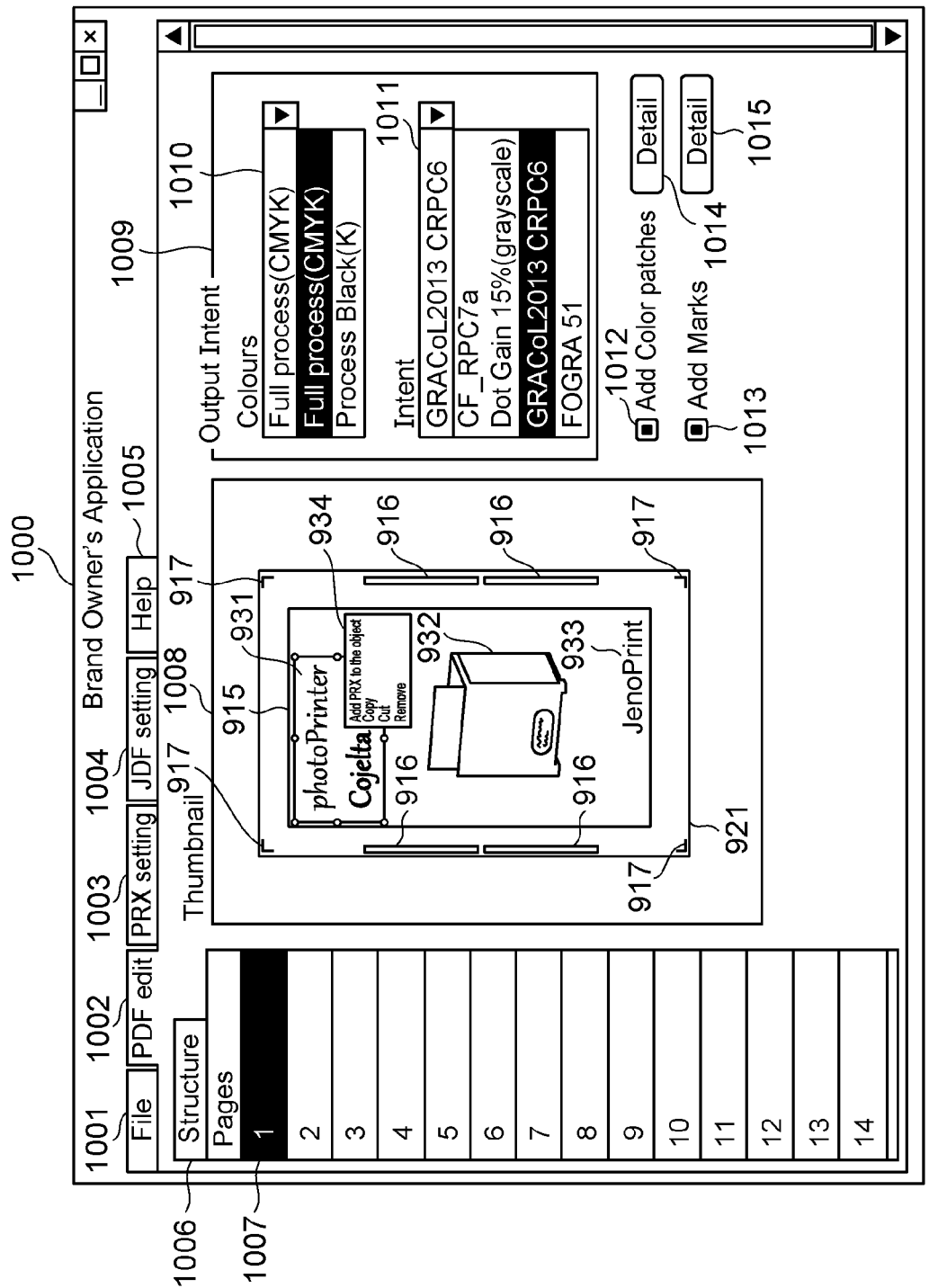
FIG. 10A is a first view for illustrating an operating unit of an application system that operates on the information processing apparatus in the customer system in the first embodiment.
Figure 10B:
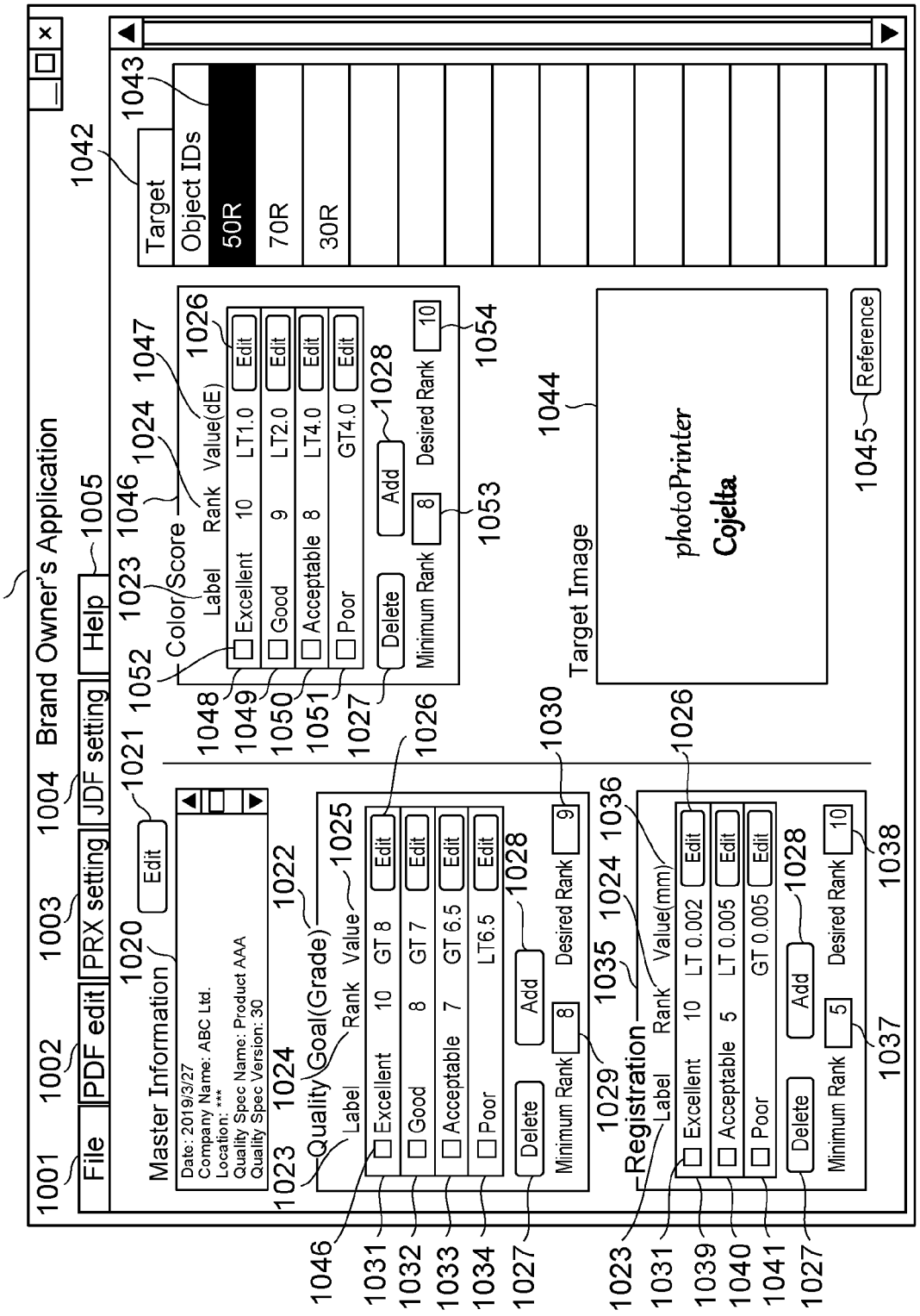
FIG. 10B is a first view for illustrating the operating unit of the application system in the first embodiment.
Figure 10C:
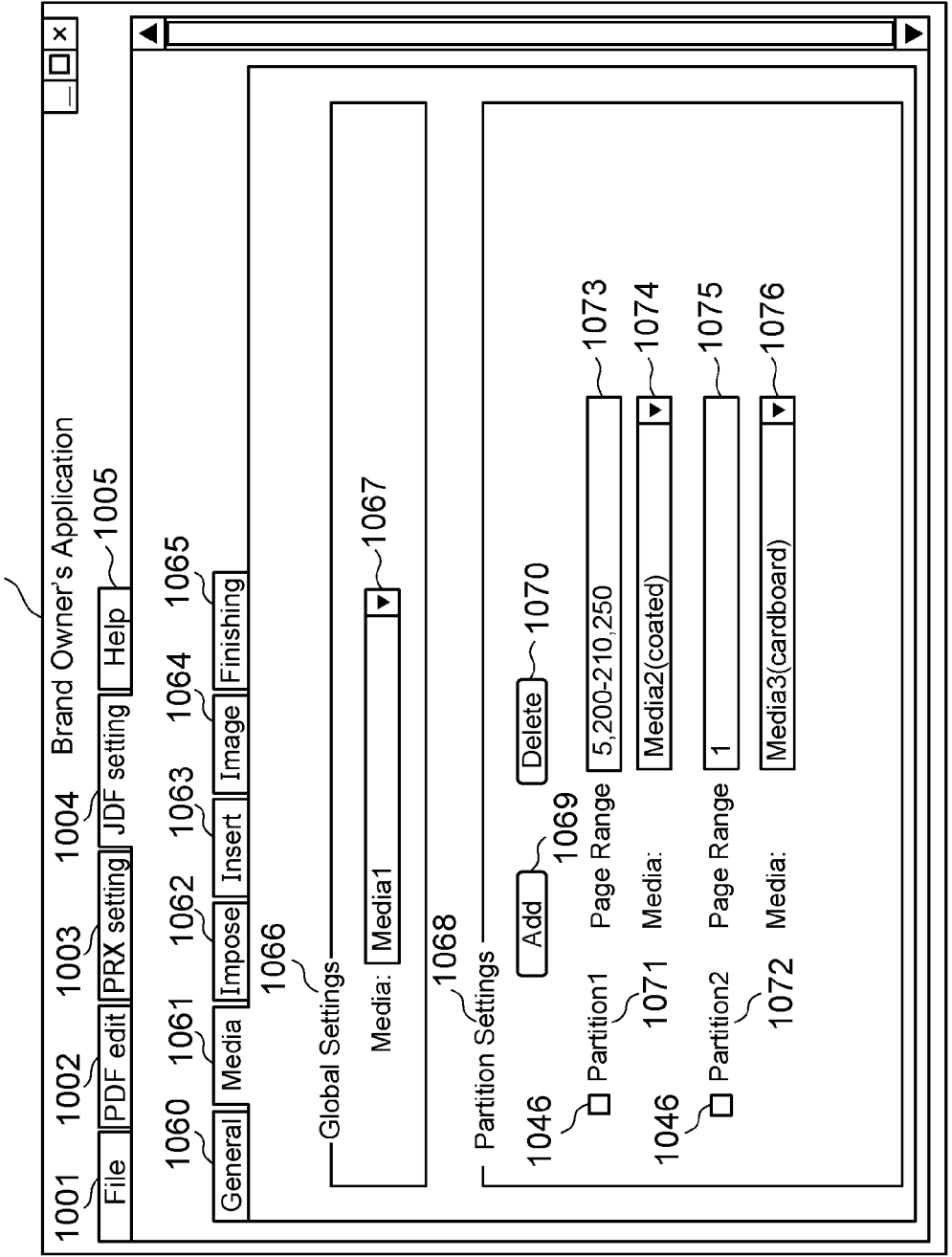
FIG. 10C is a first view for illustrating the operating unit of the application system in the first embodiment.

FIGS. 10A to 10C are views for illustrating the configuration of a screen for creating submission data, used by a customer, in the information processing apparatus 110 in the customer system 109.

FIG. 10A shows an example of an application screen for creating or editing PDF that is image data to be submitted in the information processing apparatus 110 in the customer system 109. An application of the present embodiment is shown as an example of an application in a mode in which the same application provides functions of the application for multiple purposes in parallel and the functions are selectively used by function tabs. Therefore, a general-purpose function setting section 1001, a PDF edit section 1002, a PRX setting section 1003, a JDF setting section 1004, and a help function providing section 1005 are switched and used. These means are configured to be able to be operated by selecting an associated tab.

FIG. 10A is a view showing an example of a screen in a state where a PDF edit setting section 1002 is selected. A page select section 1006 is an area to select a page to be set at the time when a print target product is composed of a plurality of pages and different quality requirements are set page by page. In the drawing, a state where the first page (1007) is selected is shown. In other words, an example of a case where quality requirements on the first page of print target image data are set is shown. A thumbnail display area 1008 is a reference image display area for a user of the application shown in the drawing to perform various settings while visually checking image information of a page selected by the page select section 1006. The registration marks 917, the color patches 916 (shown in FIG. 9C), and quality conditions required by PRX (described later) are inspected in the printing company system 100, and, as a result, correspond to additional image information needed to generate PQX.

Registration marks 917 are set by a registration mark setting section 1013. When the registration mark setting section 1013 is used to provide an instruction to add registration marks to an image, the registration marks 917 are added to a setting target page of a PDF file. It is possible to add color patches 916 to a setting target page of a PDF file with a color patch setting section 1012.

A registration mark detail setting section 1015 and a color patch detail setting section 1014 are setting sections for setting detailed information, such as positions at the time when color patches 916 or registration marks 917 are added to an image. When, for example, these registration marks 917 or color patches 916 are superposed in an area of image information 915 of PDF, the original image is not obtained, so it is inconvenient. Therefore, the application in the present embodiment allows settings such that the positions of the color patches 916 or the registration marks 917 do not overlap the area of the image information 915 of PDF and coordinates of the image position are adjustable by these means.

Objects 931, 932, 933 are objects respectively having IDs with values of "5 0 obj", "7 0 obj", and "3 0 obj". The ID of an object is a unique value automatically assigned by an application that creates PDF or given by a user. The ID of an object is a value that does not change depending on the position of the object in PDF. Therefore, when an object ID is designated in inspection position designation of PRX (described later), it is not necessary to designate again an inspection position even when the position of an object is edited after setting.

An object context menu 934 is a menu of operation to an object displayed when right-click operation is performed in a state where the object is selected. The object context menu 934 includes an inspection setting button for designating an inspection position for a selected object. When the inspection setting button is selected, a reference value of the ID of a selected object is added to an object select section 1042 of a PRX setting section 1003 (described later).

An output intent setting section 1009 is a setting section for output intent information, implemented by a PDF edit function. The output intent setting section 1009 is made up of an image formation process information setting section 1010 used by an image forming means applied during production and a color intent setting section 1011 applied to an image produced. These pieces of output intent information are configured to be able to be individually set page by page in combination with the page select section 1006.

FIG. 10B is a view showing an example of an application screen for creating or editing PRX that is quality requirements data to be submitted in the information processing apparatus 110 in the customer system 109. When the PRX setting section 1003 is selected, the screen shown in the drawing is displayed.

A master information setting section 1020 is a setting section to input various master information needed at the time of creating PRX. Master information corresponds to various pieces of information including a date and company information required by the specifications of PRX, a name given to requirements specifications defined by PRX, and the like. These pieces of information are able to be edited by depressing a master information edit section 1021.

An integrated quality target setting section 1022 is a setting section for integrating at least one or more different types of quality requirements designated by PRX and defining an integrated quality level. Integrated quality is determined according to the following regulations. In other words, integrated quality is defined by a combination of a label 1023 that is readable information given to a quality level, a rank 1024 that is quantitative numeric value information corresponding to the label 1023, a value 1025 that defines a parameter and an expression for determining the rank 1024.

Specifically, details will be described below by using top-level quality 1031 as an example. The label of the top-level quality 1031 is defined as "Excellent". Strings applied to these labels 1023 are able to be optionally set by the user 701 who uses the application shown in the drawing, operating on the information processing apparatus 110 in the customer system 109, that is, a customer. In other words, those strings are information provided in order for an operator to be able to easily determine the meaning of defined quality level and have properties different from information used in control and the like.

On the other hand, the rank 1024 of the top-level quality 1031 is defined as 10. This is a numeric value defined by a customer in order to quantitatively determine and manage the quality of a product for which the customer makes a request of a printing company and is information intended to be used in control and the like. However, the numeric value itself of the rank 1024 is able to be optionally defined by the customer as a quantitative numeric value of the quality of a product of its own.

An example in which a value 1025 for defining the rank 1024 of the top-level quality 1031 is "GT 8" is shown in the drawing. When the numeric value of a quantitative quality index, obtained from a defined evaluation formula, is greater than or equal to eight, the rank 1024 of the top-level quality 1031 is calculated as 10, and the quality of the product is determined as top-level quality.

The other quality levels are also defined such that the ranks and the labels "Good" 1032, "Acceptable" 1033, and "Poor" 1034, are uniquely determined according to similar numeric values and values calculated from the mathematical expression. For the quality levels, a configuration that information defined by a quality level edit section 1026 can be edited is adopted in the present embodiment.

The number of quality levels can be set optionally. In other words, where necessary, when more detailed levels are designated, a new quality level is able to be added to the integrated quality target setting section 1022 by depressing a level add section 1028. In addition, levels with a checkmark are able to be deleted with a level delete section 1027.

When a customer provides quality requirements to a printing company, the customer defines acceptable conditions depending on the numeric value of the rank 1024 defined by the quality level for the quality of a produced product. The acceptable conditions are defined by using a minimum acceptable quality setting section 1029 and a desired quality setting section 1030.

The minimum acceptable quality setting section 1029 is used for a customer to define acceptable quality, that is, the minimum value of the rank 1024, at the time of delivery of a product for a printing company. In other words, it is possible to communicate quality requirements to a printing company that a product with a numeric value of the rank 1024 below the numeric value defined in the minimum acceptable quality setting section 1029, that is, eight in the example of the drawing, does not satisfy acceptable quality.

The desired quality setting section 1030 is used for a customer to define desired quality conditions, that is, the desired value of the rank 1024, at the time of delivery of a product for a printing company. In other words, it is possible to communicate a product with a numeric value of the rank 1024 above the numeric value defined in the desired quality setting section 1030, that is, nine in the example of the drawing, as quality requirements to a printing company.

An image misregistration quality setting section 1035 also defines acceptable conditions depending on the numeric value of the rank 1024 defined by the above-described quality level for image misregistration quality of a product at the time of providing quality requirements on image misregistration. Acceptable conditions are defined by the minimum acceptable image misregistration quality setting section 1037 and a desired image misregistration quality setting section 1038 on image misregistration quality.

The image misregistration quality setting section 1035 is a setting section to input quality requirements information on image misregistration of a product at the time of creating PRX. As in the case of the integrated quality target setting section 1022, the image misregistration quality setting section 1035 is configured to be able to designate the level of quality requirements on image misregistration with a means to set the label 1023 and the rank 1024.

An image misregistration quality value 1036 is defined with reference to a deviation (length or a distance between a reference image and an image of a product) from a reference position that is a measurement result of a product with respect to a required image misregistration. In other words, an example in which top-level quality 1039 in image misregistration quality is less than or equal to a deviation of 0.002 mm is shown. In other words, the drawing shows an example in which the label 1023 in the case of the top-level quality 1039 is "Excellent" and the rank is 10. Similarly, the drawing shows an example in which "Acceptable" 1040 and "Poor" 1041 in image misregistration quality are similarly defined. A function to add and delete a rank is implemented by a mechanism similar to the integrated quality target setting section 1022, so the description is omitted.

A minimum acceptable image misregistration quality setting section 1037 is a setting section with which a customer defines acceptable image misregistration quality, that is, the minimum value of the rank 1024, at the time of delivery of a product for a printing company. It is possible to communicate image misregistration quality requirements to a printing company that a product with a numeric value of the rank 1024 below the numeric value defined by the minimum acceptable image misregistration quality setting section 1037, that is, five in the example of the drawing, does not satisfy acceptable image misregistration quality.

A desired image misregistration quality setting section 1038 is a setting section with which a customer defines desired image misregistration quality conditions, that is, the desired value of the rank 1024, at the time of delivery of a product for a printing company. It is possible to communicate, to a printing company, image misregistration quality requirements on a product with a numeric value of the rank 1024 above the numeric value defined in the desired image misregistration quality setting section 1038, that is, 10 in the example of the drawing.

The object select section 1042 is an area to display a button for selecting an object to be designated as an inspection position. The reference value of the ID of the object for which the inspection setting button is selected in the object context menu 934 is displayed in the object select section 1042. The drawing shows a state where "5 0 R" button 1043 that is a button corresponding to the reference value "5 0 obj" is selected. The display may be switched to the screen at the timing at which the inspection setting button is selected. Inspection of color is representatively described in the description of the embodiment; however, it may be used to designate an inspection position for other than color.

A target image display area 1044 is an area to display the image of an object selected in the object select section 1042.

A reference data select button 1045 is a button for selecting data of a comparative reference to evaluate an inspection result of the object selected in the object select section 1042. In the case of inspection of color, color reference data is selected. The reference data select button 1045 becomes selectable only when a button corresponding to the reference value of any one of objects is selected in the object select section 1042. When the reference data select button 1045 is selected, a file select screen (not shown) is displayed, and a file can be selected.

A color quality setting section 1046 is a setting section to, at the time of creating PRX, input quality requirements information on the color of a product. As in the case of the integrated quality target setting section 1022, the color quality setting section 1046 is configured to be able to designate the level of quality requirements on color with a means to set the label 1023 and the rank 1024.

A color quality value 1047 defines a color difference (also referred to as ΔE or delta E) of a color value that is a measurement result of a product for a required color as a reference. In other words, an example in which top-level quality 1048 in color quality is less than or equal to a color difference of 1.0 is shown. In other words, the drawing shows an example in which the label 1023 in the case of the top-level quality 1048 is "Excellent" and the rank is 10. Similarly, the drawing shows an example in which "Good" 1049, "Acceptable" 1050, and "Poor" 1051 in color quality are similarly defined. A function to add and delete a rank is implemented by a mechanism similar to the integrated quality target setting section 1022.

The color quality setting section 1046 also defines acceptable conditions depending on the numeric value of the rank 1024 defined by the above-described quality level for color quality of a produced product at the time when a customer provides quality requirements on color to a printing company. Acceptable conditions are defined by a minimum acceptable color quality setting section 1053 and a desired color quality setting section 1054 on color quality.

The minimum acceptable color quality setting section 1053 is used for a customer to define acceptable color quality, that is, the minimum value of the rank 1024, at the time of delivery of a product for a printing company. In other words, it is possible to communicate color quality requirements to a printing company that a product with a numeric value of the rank 1024 below the numeric value defined in the minimum acceptable color quality setting section 1053, that is, eight in the example of the drawing, does not satisfy acceptable color quality.

The desired color quality setting section 1054 is used for a customer to define desired color quality conditions, that is, the desired value of the rank 1024, at the time of delivery of a product for a printing company. In other words, it is possible to communicate, to a printing company, color quality requirements on a product with a numeric value of the rank 1024 above the numeric value defined in the desired color quality setting section 1054, that is, 10 in the example of the drawing.

FIG. 10C is a view showing an example of an application screen for creating or editing job ticket, that is, JDF data, that is print setting information to be submitted in the information processing apparatus 110 in the customer system 109. When the JDF setting section 1004 is selected, display control of the screen shown in the drawing is executed. The system in the present embodiment is configured such that the JDF setting section 1004 allows selection of further detailed setting items as shown in the drawing. In other words, for functions to be set, there are a general setting section 1060, a media setting section 1061, an imposition setting section 1062, an insertion paper setting section 1063, an image processing setting section 1064, a post-processing setting section 1065, and the like. The example of the screen shown in the drawing shows an example of a display state of a screen in the case where the media setting section 1061 is selected.

As shown in the drawing, the media setting section 1061 is made up of a global job media setting section 1066 and a partition job media setting section 1068. The global job media setting section 1066 is provided to select a piece of media used in a job. In other words, the example shown in the drawing shows a state where "Media1" is selected in a global job media species select section 1067. In other words, it means that, in executing a print process with this JDF, a piece of media used during printing is set to "Media1". On the other hand, the partition job media setting section 1068 is a setting means to be used in the case where a piece of media different from a piece of media set in the global job media setting section 1066 is set for a specific page or page range. In the example shown in the drawing, the partition job media setting section 1068 provides a means to create and delete a page range to be set with a page range add section 1069, checkboxes 1046, and a page range delete section 1070, to be set.

In the drawing, a state where two page ranges are created is shown. In a first page range setting section 1071, page 5, page 200 to page 210, and page 250 are targets to be set in a first page range 1073. Then, an example in which a piece of media to be used for pages to be set to "Media2 (coated)" in a first partition media select section 1074 is shown.

In a second page range setting section 1072, an example in the case where page 1 is a target to be set in a second page range 1075 and a piece of media to be used for the page to be set is set to "Media3 (cardboard)" in a second partition media select section 1076 is shown.

Figure 11A:
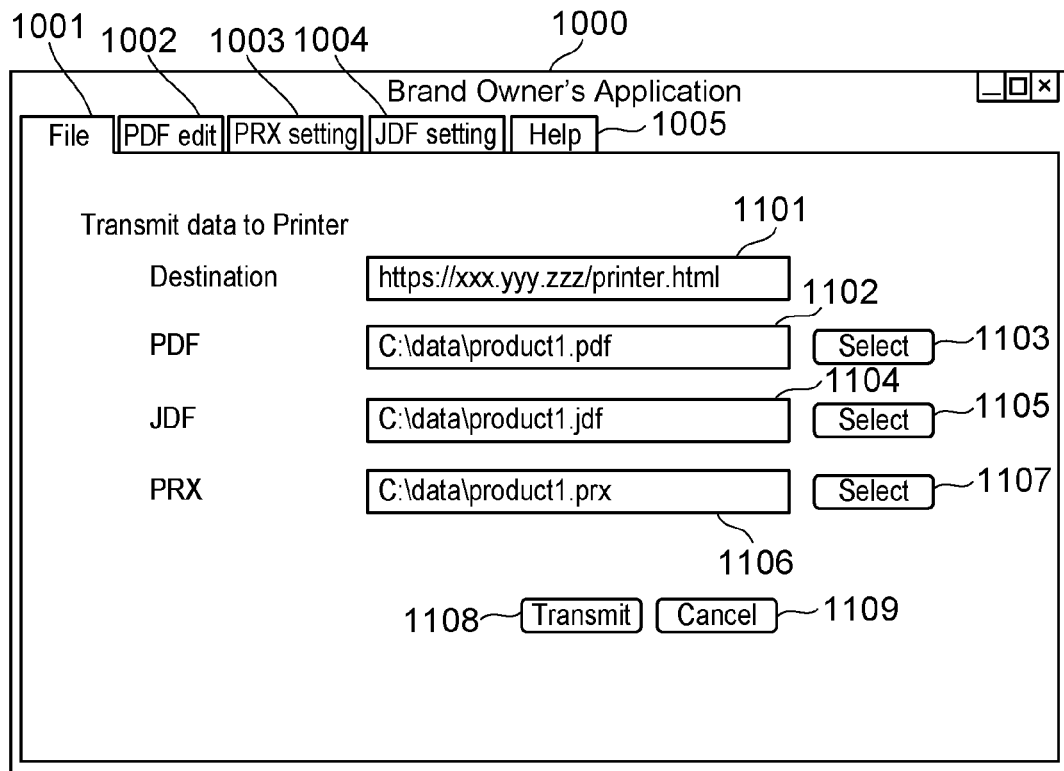
FIG. 11A is a second view for illustrating the operating unit of the application system in the first embodiment.
Figure 11B:
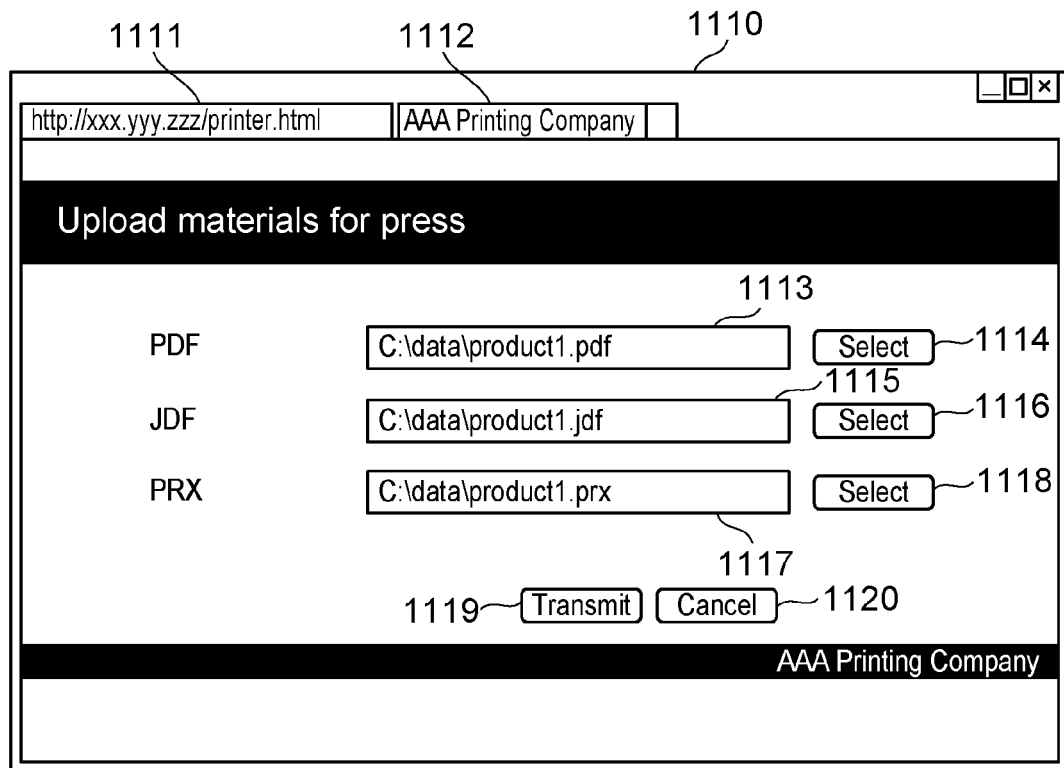
FIG. 11B is a second view for illustrating the operating unit of the application system in the first embodiment.

FIGS. 11A and 11B are views each showing an example of an application screen at the time of executing a process of submitting PRX that is quality requirements data, JDF, and PDF, to be submitted, in the information processing apparatus 110 in the customer system 109 to the printing company system 100.

FIG. 11A is a view showing an example of a screen 1000 in the case of a mode of providing a function to transmit submission data to the printing company system 100 as part of the function of the application shown in FIGS. 10A to 10C. In other words, the screen shown in the drawing is displayed when the general-purpose function setting section 1001 is selected.

A transmission destination information setting section 1101 is a designation section to designate the address of the web service provided as a submission means by the web server 504 operating on the information processing apparatus 102 in the printing company system 100.

A first PDF file select section 1102 and a first PDF file select instruction section 1103 both are select sections to select a PDF file that is image data to be submitted from a file system included in the information processing apparatus 110 in the customer system 109.

A first JDF file select section 1104 and a first JDF file select instruction section 1105 are select sections to select a JDF file that is job setting data to be submitted from a file system included in the information processing apparatus 110 in the customer system 109.

A first PRX file select section 1106 and a first PRX file select instruction section 1107 are select sections to select a PRX file that is quality requirements data to be submitted from a file system included in the information processing apparatus 110 in the customer system 109.

When a first transmission instruction section 1108 is selected in a state where a data set needed for submission is selected and appropriate transmission destination information is set by the above-described means, the submission data set is transmitted to the printing company system 100. A first process cancellation instruction section 1109 is an instruction section for cancelling a submission process itself.

FIG. 11B is a view for illustrating a display state of the screen in the case where a function equivalent to the submission instruction means by the application shown in FIG. 11A is provided by an operation means of a web browser.

Transmission destination information is input to an address input section 1111 of the web browser, and the web server 504 operating on the information processing apparatus 102 in the printing company system 100 accesses the address of the web service provided as a submission means. As a result of the access, the screen shifts into a state of a submission web screen as shown in the drawing (1110, 1112).

As shown in the drawing, select means having functions equivalent to the file select means shown in FIG. 11A are provided as the screen of a web browser. In other words, a second PDF file select section 1113 and a second PDF file select instruction section 1114 correspond to the functions of the first PDF file select section 1102 and the first PDF file select instruction section 1103.

A second JDF file select section 1115 and a second JDF file select instruction section 1116 correspond to the functions of the first JDF file select section 1104 and the first JDF file select instruction section 1105.

A second PRX file select section 1117 and a second PRX file select instruction section 1118 correspond to the functions of the first PRX file select section 1106 and the first PRX file select instruction section 1107.

A second transmission instruction section 1119 corresponds to the function of the first transmission instruction section 1108. A second process cancellation instruction section 1120 corresponds to the function of the first process cancellation instruction section 1109.

The description of the functions equivalent to the means shown in FIG. 11B has been described with reference to FIG. 11A, so the description of the functions is omitted.

FIGS. 12A to 12D are views for showing an example of various pieces of submission target data generated as the result that a customer operates by using the operation means shown in FIGS. 10A to 10C. Hereinafter, details will be described for each data type.

FIG. 12A is an example of job ticket in JDF format, generated with FIG. 10C, that is, a means of creating or editing JDF data that is job ticket that is print setting information, to be submitted, in the information processing apparatus 110 in the customer system 109.

Job ticket includes information as follows. In other words, Job ticket includes the number of pages (1201) included in a copy, global job print parameters 1202, and partition job print parameters (1206, 1208).

The global job print parameters 1202 include a total number of copies printed 1203 and a media setting 1204 used in a global job. The partition job print parameters (1206, 1208) include page range information (1205, 1209) designated as a partition, and a media setting (1207, 1210) used as a partition.

Actual details of settings of the media setting 1204 used in a global job and the media settings (1207, 1210) used in part of a job are defined in media tags (1211, 1214, 1217). The media tags (1211, 1214, 1217) further include setting information including media types (1213, 1216, 1219), media sizes (1212, 1215, 1218), and the like.

FIG. 12B is a view showing an example of PRX data generated with FIG. 10B, that is, a means to create or edit PRX that is quality requirements data, to be submitted, in the information processing apparatus 110 in the customer system 109. PRX data includes information as follows. In other words, the PRX data includes master information 1220 and integrated quality target setting information 1221.

The integrated quality target setting information 1221 further includes quality level defining sections (1222, 1223, 1224, 1225), minimum acceptable quality setting information 1226, desired quality setting information 1227, and the like. The meanings of pieces of information equivalent to these have been described with reference to FIG. 10B, so the description is omitted.

A color quality information defining section 1228 is made up of pieces of information that store various pieces of setting information on color quality of a product. Furthermore, the color quality information defining section 1228 is made up of parts of a color quality evaluation defining section 1229 that stores information on an evaluation of color quality and a color quality measurement defining section 1239 that stores information on measurement. The color quality information defining section 1228 includes a unit information defining section 1231 for defining a color difference that is color quality, defining sections (1233, 1234, 1235, 1236) for color quality levels, and the like. The color quality information defining section 1228 also includes minimum acceptable color quality setting information 1237, desired color quality setting information 1238, and the like. The meanings of pieces of information equivalent to these have been described with reference to FIG. 10B, so the description is omitted. The color quality measurement defining section 1239 is made up of a colorimetric position defining section 1240 that defines a colorimetric position and a reference color data defining section 1241 to be compared with a colorimetric result.

A reference color detailed information defining section 1242 is provided to define reference data (a correct value and a reference value) desired as color quality. The reference color detailed information defining section 1242 includes a CXF information defining section 1243 and an optical spectrum information storage section 1244 that is one of a means of expressing color information as a specific example in the present embodiment.

A colorimetric position data defining section 1245 is a part referenced from the colorimetric position defining section 1240 and is used to designate a colorimetric position by image data. In the present embodiment, a colorimetric position is designated by the ID of an object in a PDF file. Colorimetric position designation 1246 having a value of "CL1" in Id designates an object of which ID is "6 0 R" in PDF as a colorimetric position.

FIG. 12C is a view for illustrating an example of an inspection result at the time when the inspection unit 214 of the image forming apparatus 103 or the image forming apparatus 104 performs inspection on image information formed on a sheet that is a product. Information shown in the drawing is created by the controller unit 205 running an inspection program 410 provided in the image forming apparatus 104, and is transmitted to the work flow control program 505 that operates on the information processing apparatus 102. Hereinafter, pieces of information contained in inspection result data will be described.

An inspection execution object ID 1261 is provided to store object ID information of a target on which the inspection unit 214 has performed inspection and stores an object ID of PDF. As described above, in FIG. 10A, an inspection setting button is selected from the object context menu 934, and an object for which a reference value of the object ID is added to the object select section 1042 of FIG. 10B is a measurement target.

An inspection execution object count 1262 stores in which place an object that undergoes inspection at the time when the inspection unit 214 performs inspection by ID stored in an inspection execution object ID 1261. Since an object ID is a unique value, object IDs that do not overlap in the same PDF; however, when a plurality of copies is printed from the same PDF by multiple copy printing or multiple imposition printing, the object ID is used to distinguish measurement results of prints. The flow of a process related to creation of the inspection execution object ID 1261 and the value of inspection execution object count 1262 will be described with reference to FIG. 13.

Optical spectrum data 1263 is numeric value data of an optical spectrum that is color information of an image on a sheet from the third inspection unit 912 and the fourth inspection unit 913 shown in FIG. 9B in the inspection unit 214. The optical spectrum data 1263 is stored in PQX data (described later) and used to provide a customer with an inspection result on color quality.

FIG. 12D is a view showing print quality report data, that is, an example of PQX data, that is created by the work flow control program 505 receiving inspection information shown in FIG. 12C. Hereinafter, of pieces of information included in PQX, major ones will be described.

PQX header information 1267 is a storage area for main information that should be held by PQX data.

A work report storage section 1268 is used to store a quality inspection result made at the time when the image forming apparatus 103 or the image forming apparatus 104 executes a process, and general-purpose information associated with the quality inspection result.

An inspection result storage area 1272 is a storage section provided for the purpose of recognizing results of various inspections on product creation quality, performed by the inspection unit 214, for each type of inspection and storing the inspection results.

A color quality report storage section 1273 is an area for storing report information on color information out of quality report information that is included in PQX and provided by a printing company to a customer. Information in the area is created in accordance with the optical spectrum data 1263 shown in FIG. 12C. In other words, the information in the area corresponds to a reference link 1274 of the optical spectrum data 1264, an actual optical spectrum data storage section 1276 and optical spectrum data 1278, referenced by the reference link 1274, and a measurement position designation section 1275.

Data stored in the optical spectrum data storage section 1276 from PQX received from the third receiving program 609 is compared with the color quality information defining section 1228 transmitted as PRX by the third transmission program 608, and a color difference (delta E) is calculated. Then, a process of deriving the rank 1024 from the value 1047 defined in the color quality setting section 1046 in FIG. 10B is executed, and the rank 1024 is used to derive determination information on color quality.

The measurement position designation section 1275 is a part for indicating a colorimetric position by the ID of an object. The measurement position designation section 1275 is a reference link, and actual object information indicating a colorimetric position is stored in colorimetric position data 1280 of which Id coincides with the Id of a reference link in colorimetric position designation image data 1279. The colorimetric position data 1280 stores the ID and count value of colorimetric object created from the inspection execution object ID 1261 and the inspection execution object count 1262, shown in FIG. 12C.

Data stored in the image misregistration quality report storage section 1278 from PQX received from the third receiving program 609 is compared with the optical spectrum information storage section 1244 transmitted as PRX by the third transmission program 608, and a misalignment amount is calculated. Then, a process of deriving the rank 1024 from the value 1036 defined in the image misregistration quality setting section 1035 in FIG. 10B is executed, and the rank 1024 is used to derive determination information on image misregistration quality.

Figure 13:
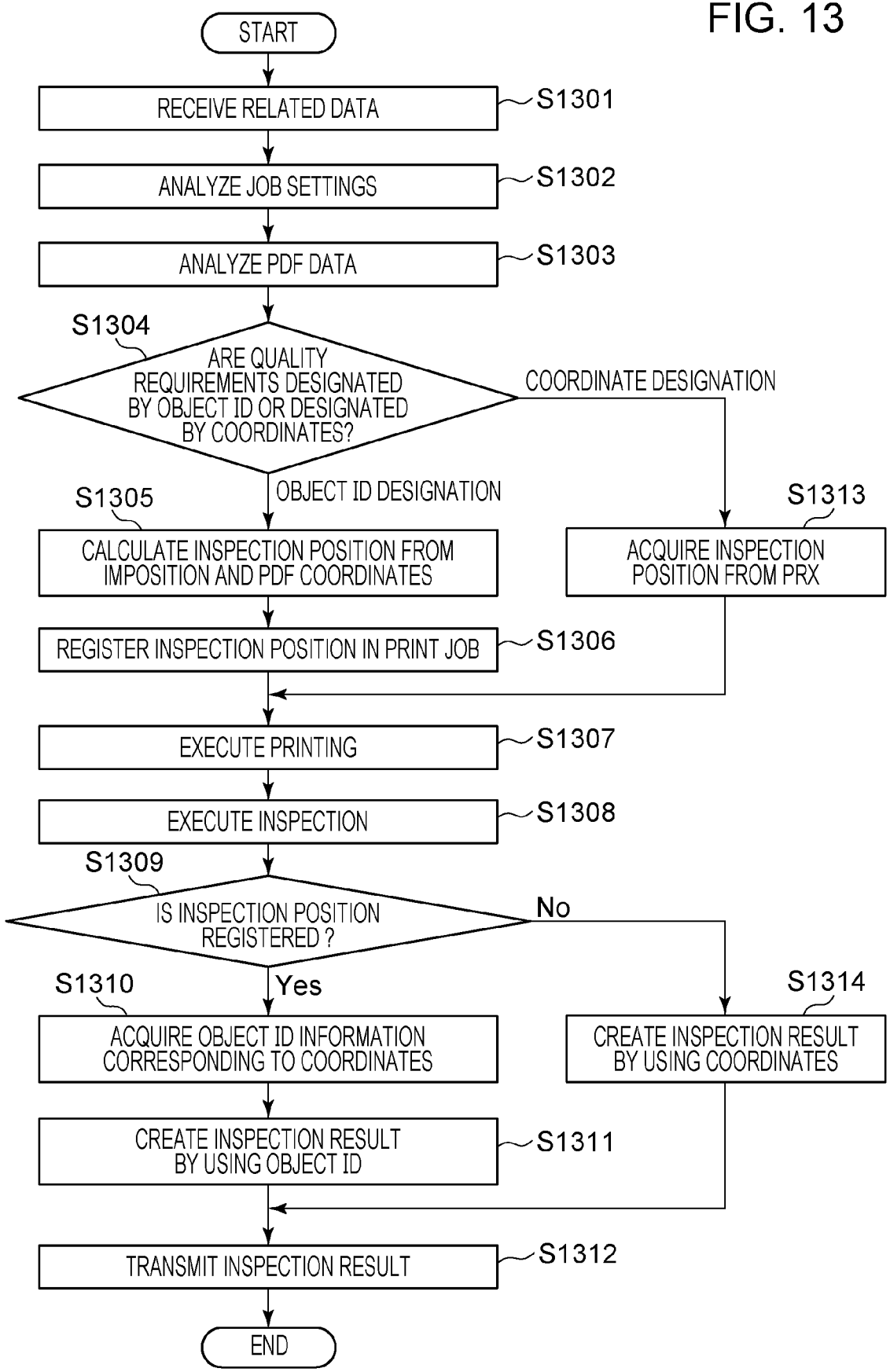
FIG. 13 is a flowchart illustrating the flow of a process of a controller unit 205 of the image forming apparatus 103 or the image forming apparatus 104 from when a print instruction is received in the first embodiment.

FIG. 13 is a flowchart showing the flow of a process of the controller unit 205 at the time of receiving a job generation instruction in S726. The description partially overlaps the description of FIG. 7. Here, a method of determining an inspection position of quality requirements in which a colorimetric position is designated by object ID in PRX data of FIG. 12B will be mainly described.

In S1301, the controller unit 205 receives data related to a job process from the work flow control program 505. The data related to a job process includes JDF of print settings, quality measurement parameters obtained by analyzing PRX (including inspection instruction information) of quality requirements, PDF to be printed, and the like. Upon receiving the reception data, the process proceeds to S1301.

In S1302, the controller unit 205 analyzes the JDF received in S1301. Analysis of JDF has been described in connection with the JDF function program 406 of FIG. 4. After analysis of the JDF, the process proceeds to S1303.

In S1303, the controller unit 205 analyzes the PDF received in S1301. Analysis of PDF has been described in connection with the PDF function program 407 of FIG. 4. Rasterization and imposition are performed in the process of analyzing the PDF, and the PDF is converted to image data to be used for printing. At this time, positions at which the objects of PDF are printed are determined. After analysis of the PDF ends, the process proceeds to S1304.

In S1304, the controller unit 205 determines whether the inspection position is designated by object ID (the identification information of an object) or designated by coordinates (coordinate information) in the quality measurement parameters received in S1301. The process is selected in accordance with the determination result. When the inspection position is designated by object ID, the process proceeds to S1306. When the inspection position is designated by coordinates, the process proceeds to S1313. FIGS. 22A and 22B are examples of PRX (quality requirements data). FIG. 22A is an example of object-designated PRX. 2201 represents object ID. FIG. 22B is an example of coordinate-designated PRX. 2202 represents coordinates of an inspection position. The examples of PRX are one examples, and designation of an inspection position may be other description.

In S1305, the controller unit 205 calculates a point on an object as an inspection position from imposition acquired by analysis of the JDF, the object ID acquired by analysis of the PDF and PDF coordinates of the object. Calculation of an inspection position will be described with reference to FIG. 21A and FIG. 21B. After calculation, the process proceeds to S1307. In S1313, the controller unit 205 acquires the inspection position from PRX.

In S1306, the controller unit 205 associates the print position of the object for which the inspection position is designated by object ID as the inspection position and stores the inspection position in the RAM 208. FIG. 20 is a schematic view of data to be stored.

In S1307, the controller unit 205 executes printing. The print process has been described with reference to FIGS. 2, 4, and 9A to 9C. After the print completes, the process proceeds to S1308.

In S1308, the controller unit 205 executes inspection. The inspection process has been described with reference to FIGS. 2, 4, and 9A to 9C. For the inspection position, in the case of object designation, the inspection position calculated in S1305 is used; whereas, in the case of coordinate designation, the inspection position acquired in S1313 is used. After the inspection completes, the process proceeds to S1309.

In S1309, the controller unit 205 acquires the inspection position from the result of inspection, acquired in S1308, and determines whether the inspection position coincides with the inspection position registered in S1306. In other words, it is determined whether there is an object of which the inspection position coincides in the data table shown in FIG. 20. In the case of object designation, it is determined that there is an object. When there is an object, the process proceeds to S1310; otherwise, the process proceeds to S1311.

In S1310, the controller unit 205 acquires the object ID and count stored in association with the inspection position. After acquisition, the process proceeds to S1311.

In S1310, the controller unit 205 creates an inspection result by using the object ID. The inspection result has been described with reference to FIG. 12C. The inspection execution object ID 1261 and the inspection execution object count 1262 are the object ID and count acquired in S1310, and the optical spectrum data 1263 is the inspection data acquired in S1308. After the inspection result is created, the process proceeds to S1312. In S1314, the controller unit 205 creates an inspection result by using coordinates.

In S1312, the controller unit 205 transmits the inspection result to the information processing apparatus 102. Transmission of the inspection result has been described in connection with the first transmission program 405 of FIG. 4. After the inspection result is transmitted, the flowchart ends.

FIG. 20 is a schematic view of the data table that stores identification information of an object and a position at which the object is printed, that is, an inspection position, in association with each other. In the present embodiment, the data table is stored in the RAM 208 of the image forming apparatus 104.

A continuous form sheet inspection position correspondence table 2000 is a table for storing an inspection position in a printer that handles a continuous form sheet in association with identification information of an object. An object ID 2001 and a count 2002 indicating the number of prints of the object are stored as identification information of the object, and a print position 2003 of the object on a continuous form sheet is stored as an inspection position.

A cut sheet inspection position correspondence table 2010 is a table for storing an inspection position in a printer that handles a cut sheet in association with identification information of an object. Identification information of an object is the same as in the case of a continuous form sheet; however, a sheet count 2011 indicating what number of sheet the inspection position is on and a print position 2012 of an object on a cut sheet.

As described above, the inspection unit 214 handles a position to perform inspection by a position on a printed matter. On the other hand, when an inspection result is transmitted to the information processing apparatus 102, the inspection result becomes identification information of the object as shown in FIG. 12C. In step 1310, by referencing the inspection result received from the inspection unit 214 and the table shown in FIG. 20, the inspection position is converted to the identification information of the object, with the result that the ID that is the identification information of the object and the count that is the number of prints are acquired.

Figure 21A:
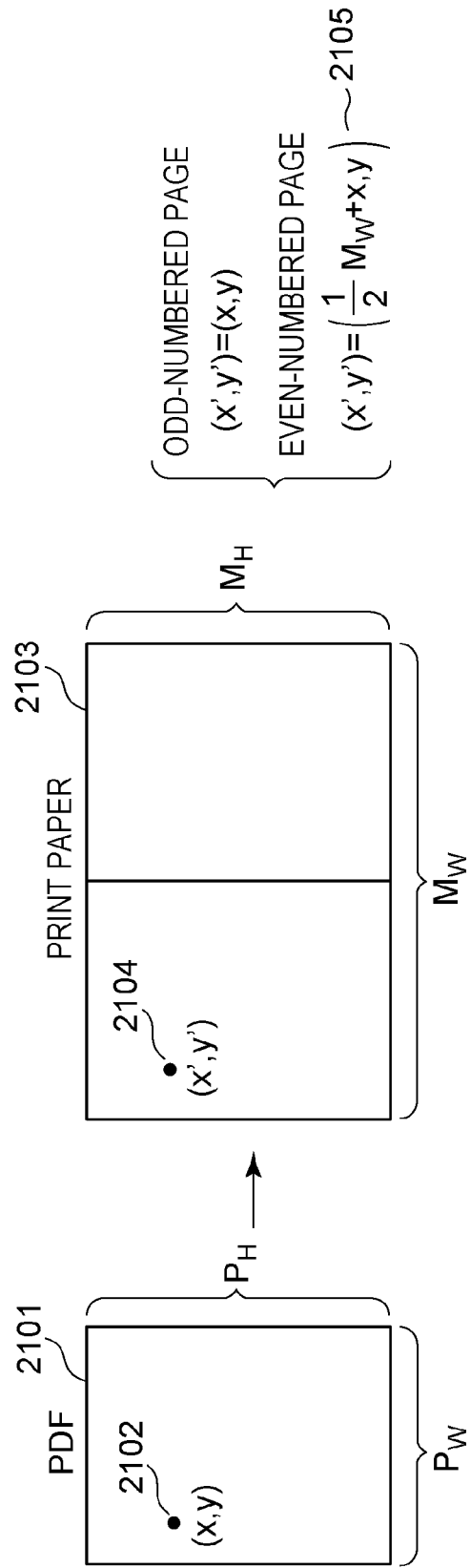
FIG. 21A is a view illustrating an example of calculating coordinates of an inspection position from PDF coordinates and imposition information.

FIGS. 21A and 21B are views illustrating examples of a process of calculating an inspection position corresponding to an object ID. FIG. 21A is a view showing an example in the case of 2in1 imposition on paper with a size twice as large as a PDF page size. FIG. 21B is a view showing an example in the case where a paper size is different from a PDF page size and imposition is performed by fitting the PDF page size to the paper size by expanding or contracting. PDF coordinates and coordinates on a printed paper both are set in accordance with a coordinate system with an origin set at the bottom left corner, and the unit is pt=$\frac{1}{72}$ inches.

In FIG. 21A, since two PDF pages are printed on one sheet of paper, coordinates (X', Y') of a point 2104 on paper on which coordinates (X, Y) of a selected point 2102 on PDF page 2101 are printed are calculated by using a coordinate conversion formula 2105. In other words, for coordinates (X', Y'), in the case of odd-numbered pages, a coordinate point on PDF is directly converted to coordinates on printed paper, and, in the case of even-numbered pages, a coordinate point on PDF is converted to a position shifted by the width of PDF page, that is, half of the width of paper.

In FIG. 21B, there is a shift between coordinates (X, Y) of a selected point 2102 on PDF and coordinates (X', Y') of a point 2104 on paper printed by the amount of the ratio between the size of PDF page and the size of paper.

Therefore, the coordinates (X', Y') of the point 2104 on paper are calculated by using a coordinate conversion formula 2106.

By similar calculation, even with any print settings or any PDF, it is possible to calculate the position of an object on printed paper from information on imposition setting, PDF page information, and position information of the object.

Since PQX that reports quality has specifications in which an inspection position is described by coordinates, it has not been clear what is the result of measurement in the case of object designation. In other words, when arrangement is different even for the same inspection target, PQX describes results for different coordinates, so it has been difficult to reference the report. In contrast, according to the present embodiment, a quality report is also described in association with identification information of an object to be inspected, with the result that it is clear what a quality report is made on.

As described above, the image forming apparatus according to the present embodiment is capable of designating an inspection position by an object ID in PDF, with the result that time and effort to create quality requirements again are omitted even when the position of an object changes. Furthermore, a customer is able to designate an inspection position not only by an object ID but also by coordinates and is able to acquire quality report data with a description method corresponding to designation, so it is easy to perform checking. When the result of quality measurement designated by an object ID is stored in association with the object ID and is provided as notification, which object is measured to obtain the inspection result is easily identified.

Second Embodiment

The first embodiment is applicable only when the inspection apparatus is an in-line apparatus. A second embodiment provides a configuration that can be implemented even with an off-line inspection apparatus. Portions common to the first embodiment will not be described.

Figure 14:
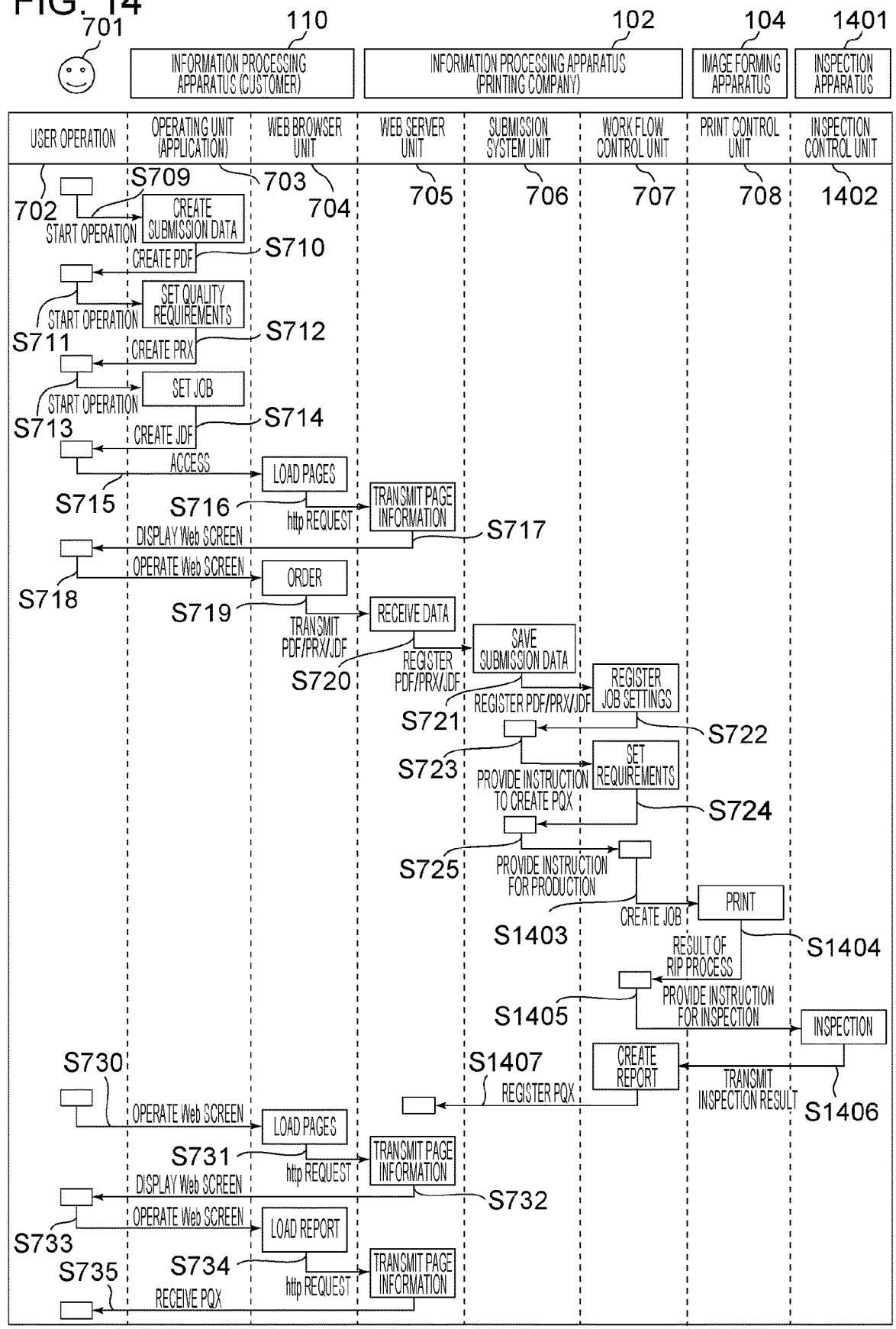
FIG. 14 is a system flow for illustrating a process flow of an entire print processing system in a second embodiment.

FIG. 14 is a system flowchart in the second embodiment. Like reference signs denote the same portions as the components of FIG. 1 and the processes of FIG. 7.

An inspection apparatus 1401 is an off-line inspection apparatus, that is, an independent inspection apparatus not connected to the image forming apparatus 104. Here, it is assumed that the inspection apparatus 1401 is connected to the information processing apparatus 102 via a network and is able to receive an inspection instruction from the work flow control unit 707. The inspection apparatus 1401 may be not connected to the information processing apparatus 102 and may be configured to receive an inspection instruction by using a barcode or the like.

An inspection control unit 1402 is a portion that controls the operations of the inspection apparatus 1401.

In S1403, the work flow control unit 707 generates a print job to the print control unit 708 that is a component of the image forming apparatus 104. The print job does not include execution of inspection.

In S1404, the print control unit 708 starts a print process. After the print completes, a table that stores the correspondence between identification information of an object and a print position, created during analysis of PDF data, that is, information corresponding to FIG. 20, is transmitted to the information processing apparatus 102. The information processing apparatus 102 stores data in the RAM 302.

In S1405, the print control unit 708 provides an inspection instruction to the inspection control unit 1402. The inspection position designated by the ID of an object in quality requirements is converted to an inspection position that is coordinates on a printed matter by referencing the data stored in the RAM 302 in S1404, that is, the data shown in FIG. 20. The inspection position obtained by this conversion is used for the inspection instruction.

In S1406, the inspection control unit 1402 transmits an inspection result to the work flow control unit 707. The inspection result is created in association with the inspection position included in the inspection instruction received in S1405. The description will be made with reference to FIG. 15.

In S1407, the print control unit 708 converts the inspection position included in the inspection result received in S1406 to identification information of an object by referencing the data stored in the RAM 302 in S1404, that is, the data shown in FIG. 20. Print quality report data of FIG. 12D is created by using the obtained ID and count of the object.

Figure 15:
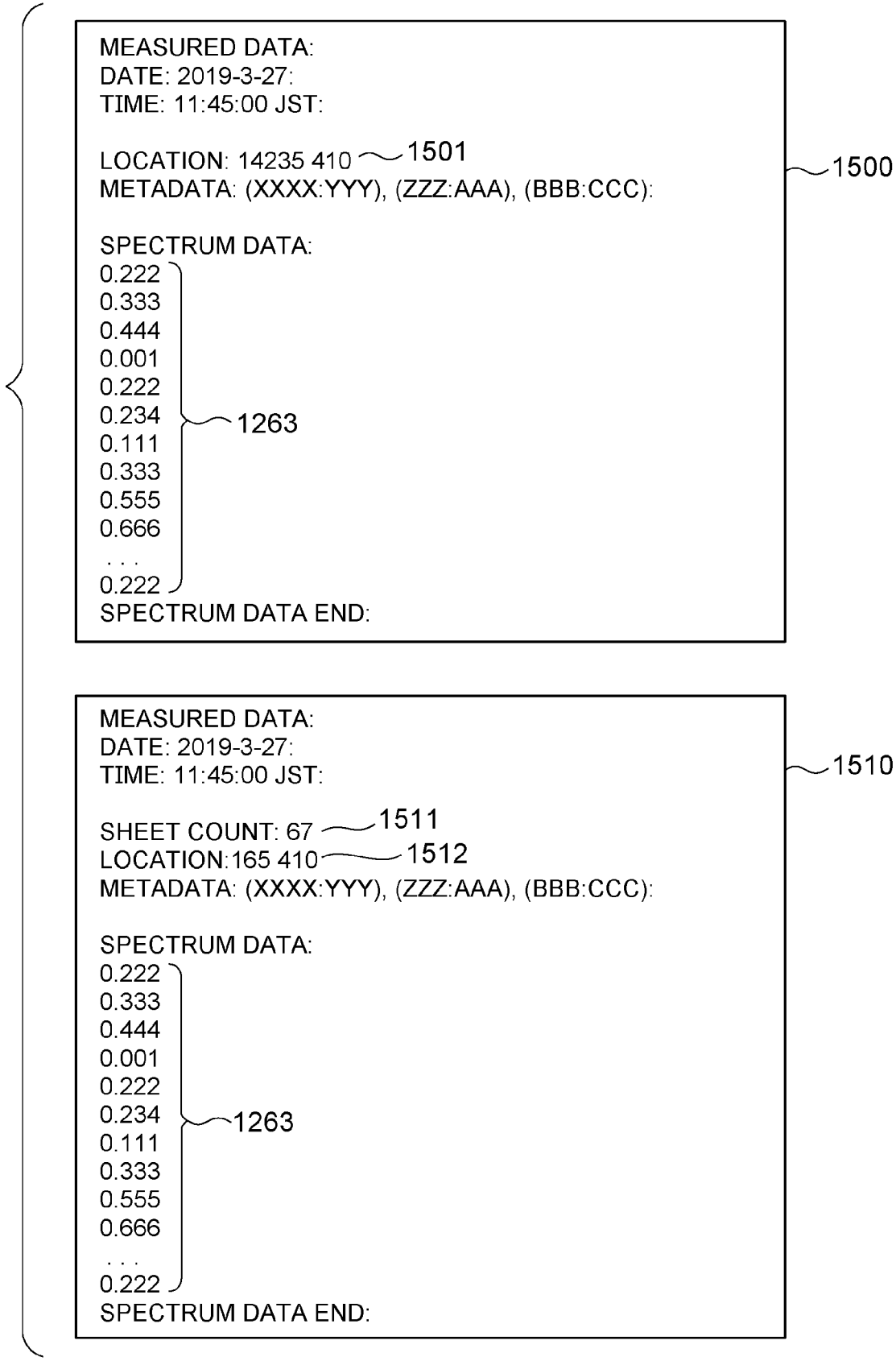
FIG. 15 is an example of an inspection result in the second embodiment.

FIG. 15 is an example of the inspection result created by the inspection control unit 1402 in S1406 and transmitted to the work flow control unit 707. Like reference signs denote the same portions as those of FIGS. 12A to 12D.

A continuous form sheet inspection result 1500 shows an example of an inspection result for a continuous form sheet.

A continuous form sheet inspection position 1501 is that an inspection position at which inspection is performed is indicated by coordinates on a printed matter. When the inspection position corresponding to the coordinates shown here is stored in the continuous form sheet inspection position correspondence table 2000, it indicates that the inspection position in quality requirements is the result of inspection designated by object ID.

A cut sheet inspection result 1510 shows an example of an inspection result for a cut sheet.

A sheet count 1511 is a value indicating a sheet on which inspection is performed. A cut sheet inspection position 1512 is that an inspection position at which inspection is performed is indicated by coordinates on a printed matter. By referencing two values, an inspection position on a printed matter can be uniquely identified. When the inspection position corresponding to the sheet count and the coordinates, shown here, are stored in the cut sheet inspection position correspondence table 2010, it indicates that the inspection position in quality requirements is the result of inspection designated by object ID.

As described above, in the system described in the present embodiment, the work flow control unit 707 takes correspondence of inspection position between the identifier of an object designated as an inspection position in quality requirements and an inspection position on a printed matter. Thus, even when the off-line inspection apparatus performs inspection, it is possible to designate an inspection position by object ID.

Third Embodiment

In the first and second embodiments, the image forming apparatus 104 performs ripping of PDF and creates correspondence between an object ID and an inspection position. A third embodiment describes an embodiment in which the information processing apparatus 110 is configured to execute a rip process.

In the first and second embodiments, it is not necessary to designate an inspection position again even when the position of an object is changed in the same PDF; however, it is necessary to designate an object again even when the same object ID is used in different PDFs. The third embodiment describes an embodiment in which it is not necessary to designate an object again even in different PDFs.

FIG. 16 schematically shows information that the information processing apparatus 110 stores in the HDD 311 or the RAM 302.

Object ID column 1601, inspection details column 1602, reference data column 1603, and evaluation data column 1604 respectively store the ID of an object to be inspected, the details of inspection to be performed, a file name of data referenced to evaluate an inspection result, and evaluation data. Evaluation data includes label, rank, and value that are criteria of evaluation. In the row of the object ID "5 0 R" in FIG. 16, colorimetry as inspection details, "corplogo.cxf" as reference data, label "Excellent" and rank 10 as evaluation data, value LT1.0, . . . are registered.

When a PDF file is selected by using the PDF file select instruction section 1103 of FIG. 11A, the CPU 301 compares an object ID of the selected PDF with the object IDs registered in FIG. 16. Then, inspection details, reference data, and evaluation data recorded in association with one another are read and settings of PRX are automatically created. Registration of FIG. 16 may be performed on the screen of FIG. 10B or may be performed on another screen with which equivalent settings can be set.

The embodiment shown in FIG. 16 may be used in combination with the first embodiment or the second embodiment.

FIG. 17 is a view illustrating programs of the image forming apparatus 104 in the present embodiment. In the present embodiment, the work flow control program 505 performs analysis of JDF and analysis of PDF. Like reference signs as those in FIG. 4 denote the same portions as those of the first and second embodiments.

A print job management program 1701 is a program for managing a series of processes from when a print job creation instruction is received to when a print job completes. The print job management program 1701, as well as the JDF function program 406 in the first and second embodiments, has a function to execute a JDF print function; however, the print job management program 1701 does not have a function related to a process of analyzing JDF job data. Since a JDF function program 1801 of the information processing apparatus 110 analyzes JDF in the present embodiment, notification of analyzed print setting parameters is provided to the image forming apparatus 104.

A print image management program 1702 is a program for managing image data to be printed. Since a PDF function program 1802 of the information processing apparatus 110 analyzes PDF in the present embodiment, notification of analyzed intermediate data is provided to the image forming apparatus 104. The format of intermediate data depends on the image forming apparatus 104, and intermediate data described in the present embodiment is assumed to be in a state after a print position of an object of PDF is obtained.

Figure 18:
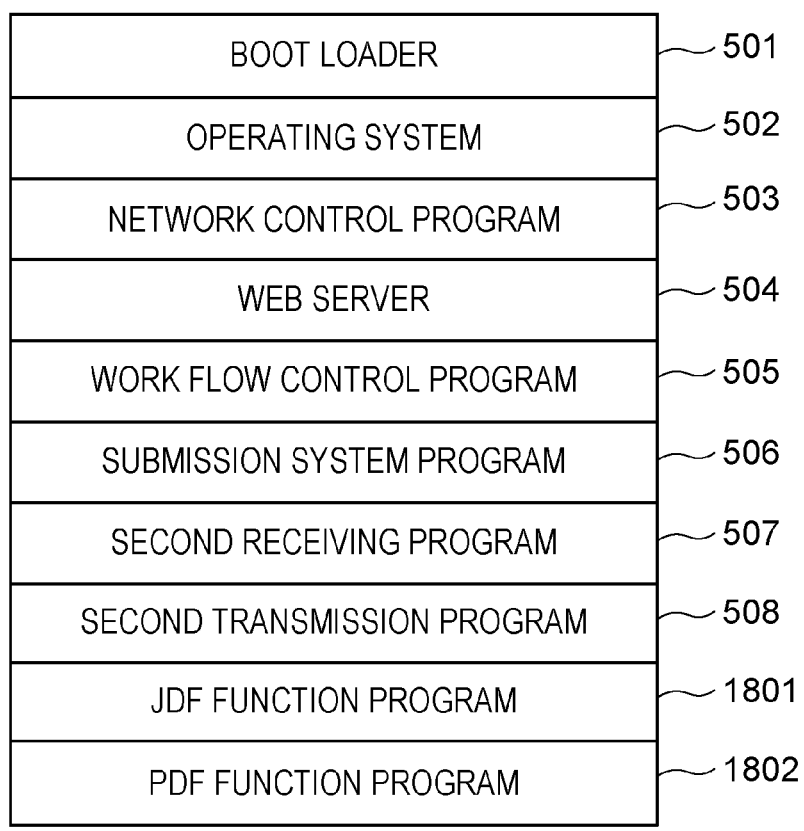
FIG. 18 is a software configuration diagram of an information processing apparatus of a printing company system in the third embodiment.

FIG. 18 is a view illustrating programs of the information processing apparatus 110 in the present embodiment. Like reference signs as those in FIG. 5 denote the same portions as those of the first and second embodiments.

The JDF function program 1801 is a program that executes a process of analyzing JDF job data, a process of determining whether an incorrect setting is included in JDF as a result of the analyzing process, and a program process of making setting changes and the like for resolving the incorrect setting.

The PDF function program 1802 is a program that executes a process of expanding PDF data. The PDF function program 1802 creates correspondence between an object ID and a position of an object on a printed matter from an analyzed result of PDF, that is, a table shown in FIG. 20, and stores the table in the RAM 302. The work flow control program 505 informs an inspection position to the image forming apparatus 104. Specifically, in PRX analyzed by the quality requirements receiving program 507, an inspection position designated by object ID is converted to an inspection position on a printed matter obtained as a result of analysis of the PDF function program 1802 and notification of the inspection position on a printed matter is provided. When an inspection result indicated by coordinates at which inspection of FIG. 15 is performed in S728 or S1406 is received, the result of analysis of the PDF function program 1802 is used again to return the coordinates to identification information of the object, and PQX of FIG. 12D is created.

Figure 19:
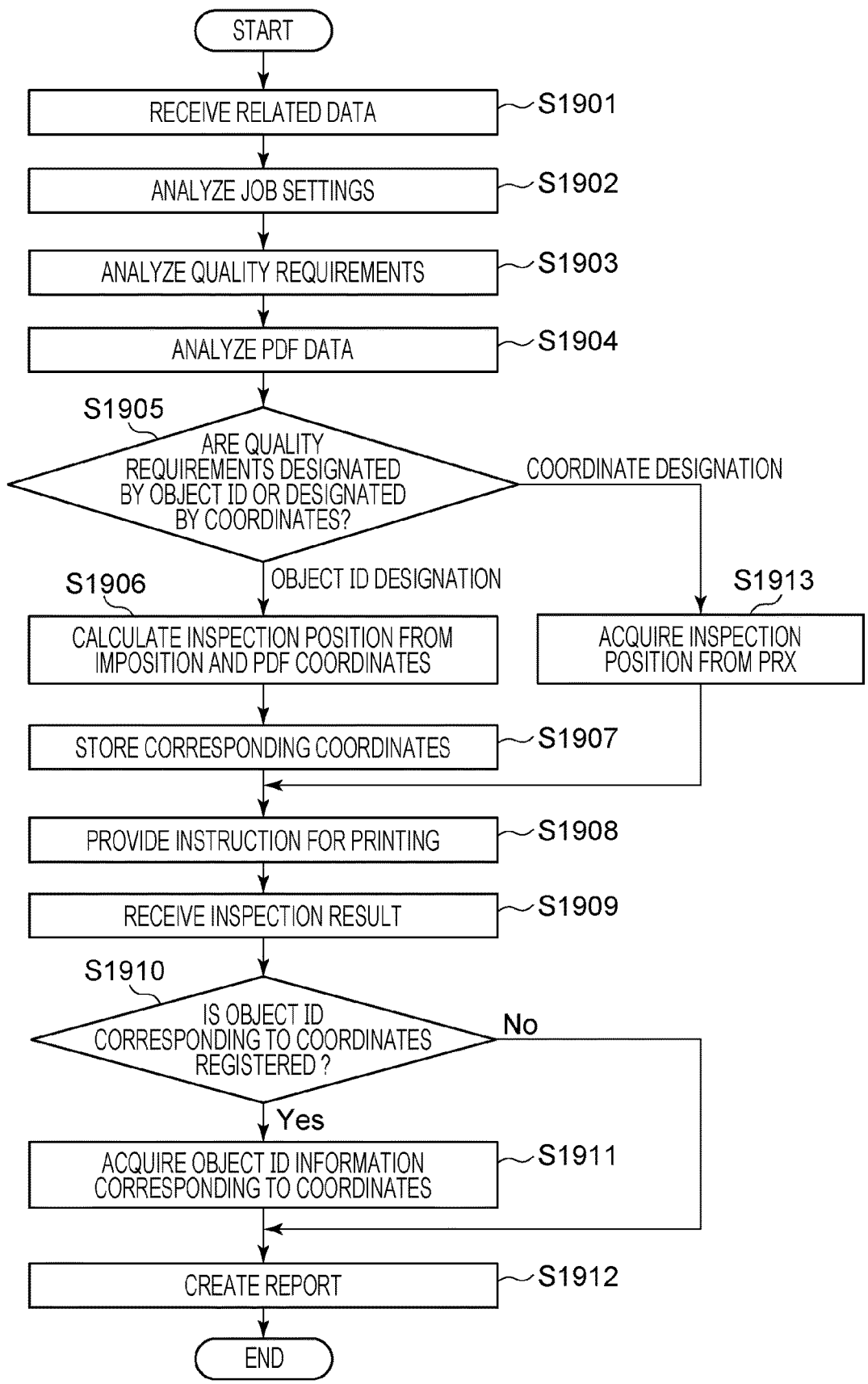
FIG. 19 is a flowchart illustrating the flow of a process of the controller unit 205 of the information processing apparatus 102 from when an order is received in the third embodiment.

FIG. 19 is the flow of a process executed by the CPU 301 of the information processing apparatus 110 until a report is created in S728, after the information processing apparatus 110 receives an order in S719. The present embodiment may be implemented with an off-line inspection apparatus; however, an example of an in-line inspection apparatus will be described here.

In S1901, the CPU 301 receives order-related data. The order-related data includes print setting JDF, quality requirements PRX, print target PDF, and the like. When the order-related data is received, the process proceeds to S1902.

In S1902, the CPU 301 analyzes JDF with the JDF function program 1801, and stores the analyzed result in the RAM 302 in association with identification information of a job. After memory, the process proceeds to S1903.

In S1903, the CPU 301 analyzes PRX (quality requirements data) with the quality requirements receiving program 507 and stores the analyzed result in the RAM 302 in association with the identification information of the job. After memory, the process proceeds to S1904.

In S1904, the CPU 301 analyzes PDF data with the PDF function program 1802, and stores the analyzed result in the RAM 302 or the HDD 311 in association with the identification information of the job. After memory, the process proceeds to S1905.

In S1905, the CPU 301 determines whether a quality measurement position is designated by object ID or designated by coordinates in the PRX analyzed in S1903. When the quality measurement position is designated by object ID, the process proceeds to S1907. When the quality measurement position is designated by coordinates, the process proceeds to S1913.

In S1905, the CPU 301 calculates a point on an object as an inspection position from imposition acquired by analysis of the JDF, and the object ID and PDF coordinates of the object, acquired by analysis of the PDF. Calculation of an inspection position will be described with reference to FIG. 21A and FIG. 21B. After calculation, the process proceeds to S1907. In S1907, the CPU 301 stores the print position of the object, calculated in S1907, in the RAM 302 or the HDD 311 in association with the object ID. After memory, the process proceeds to S1907. In S1913, the CPU 301 acquires an inspection position from the PRX analyzed in S1904.

In S1908, the CPU 301 provides a print instruction to the image forming apparatus 104 and transmits the analyzed result of the JDF, the analyzed result of the PDF, and the analyzed result of the PRX. At this time, the inspection position is designated by the inspection position on a printed matter, acquired in S1907. When the inspection apparatus is an off-line apparatus, it is not necessary to transmit the analyzed result of the PRX.

In S1909, printing and inspection end in the image forming apparatus 104, and the CPU 301 receives the inspection result of FIG. 15 together with the information identifying the job. The inspection result is expressed by using the coordinates of the inspection position. The inspection result has been described with reference to FIG. 15. When the inspection apparatus is an off-line apparatus, only notification about completion of printing is provided here, and, upon receipt of the notification, the analyzed result of the PRX is transmitted to the inspection apparatus. The CPU 301 waits until receiving an inspection result from the inspection apparatus, and the following process is the same as that in the case of an in-line apparatus.

In S1910, the CPU 301 determines whether there is an object corresponding to the inspection position described in the inspection result received in S1909. The table shown in FIG. 20 and stored in the RAM 302 is used for determination. When there is an object, the process proceeds to S1911; otherwise, the process proceeds to S1912.

In S1911, the CPU 301 acquires the identification information of the object corresponding to the inspection position on a printed matter. When the identification information of the object is acquired, the process proceeds to S1912.

In S1912, the CPU 301 creates a report. The report is PQX described with reference to FIG. 12D. When designated by object ID, a report on the inspection result is created by using the identification information of the object, acquired in S1911. When designated by coordinates, a report on the inspection result using coordinates, received in S1909, is created.

As described above, the system described in the present embodiment allows to designate an inspection position by object ID even with a configuration to execute a rip process in the information processing apparatus 110. By storing the ID of an object and information on a quality inspection performed on the that object in association with each other, it is possible to perform quality inspection without resetting quality inspection even for different PDFs.

Other Embodiments

The present invention can be implemented by processing of supplying a program for implementing one or more functions of the above-described embodiments to a system or apparatus via a network or storage medium, and causing one or more processors in the computer of the system or apparatus to read out and execute the program. Alternatively, embodiments of the present invention may be implemented by a circuit (for example, ASIC) that implements one or more functions.

Preferred embodiments of the present invention are described in detail above; however, the present invention is not limited to those specific embodiments. Various modifications and changes are possible within the scope of the present invention described in the appended claims.

According to the above-described embodiments, quality requirements are designated by the identifier of an object to be inspected, so it is not necessary to designate an inspection position again even when arrangement of an inspection target is changed. Furthermore, a quality report is described in association with the identifier of an object to be inspected, so it is easily understood for what a quality report is made on. In this way, it is possible to easily use quality requirements and a quality report.

Embodiments of the present invention are not limited to the above-described embodiments. Various changes or modifications are applicable without departing from the spirit and scope of the present invention. Therefore, the following claims are attached to show the scope of the present invention.

According to the present invention, it is beneficial that a customer is able to flexibly designate an inspection target of a product.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
at least one processor; and
a memory that stores one or more programs including instructions which, when executed by the at least one processor, cause the at least one processor to function as:
   a receiving unit configured to receive quality requirements data of a printed matter;
   a determining unit configured to determine whether the quality requirements data designates a quality requirements target in the printed matter by identification information of an object or by coordinate information;
   an identification unit configured to identify an inspection position in the printed matter, using designated information based on determination; and
   an inspection unit configured to perform quality inspection at the identified inspection position in the printed matter based on the inspection position identified by the identification unit,
   wherein, in a case where the determining unit determines that the quality requirements data designates a quality requirements target in the printed matter by the identification information of the object, the identification unit identifies a print position in a printed matter of an object corresponding to identification information of an object designated by the received quality requirements data as the inspection position, and in a case where the determining unit determines that the quality requirements data designates the quality requirements target by the coordinate information, the identification unit identifies a position indicated by the coordinate information designated by the received quality requirements data.

2. The information processing apparatus according to claim 1, wherein the instructions, when executed by the at least one processor, further cause the at least one processor to function as a creation unit to create inspection result data obtained as a result of inspection with the inspection unit.

3. The information processing apparatus according to claim 2, wherein, when it is determined that the quality requirements data designates a quality requirements target by identification information of an object, the creation means unit is configured to create the inspection result data by using the identification information of the object.

4. The information processing apparatus according to claim 2, wherein, when it is determined that the quality requirements data designates a quality requirements target by coordinate information, the creation unit is configured to create the inspection result data by using the coordinate information.

5. The information processing apparatus according to claim 1, wherein the information processing apparatus is an image forming apparatus.

6. A control method for an information processing apparatus, the control method comprising:
receiving quality requirements data of a printed matter;
determining whether the quality requirements data designates a quality requirements target in the printed matter by identification information of an object or by coordinate information;
identifying an inspection position in the printed matter, using designated information based on determination; and
performing quality inspection at the identified inspection position in the printed matter based on the inspection position identified in the identifying,
wherein, in a case where the determining determines that the quality requirements data designates a quality requirements target in the printed matter by the identification information of the object, the identifying identifies a print position in a printed matter of an object corresponding to identification information of an object designated by the received quality requirements data as the inspection position, and in a case where the determining determines that the quality requirements data designates the quality requirements target by the coordinate information, the identifying identifies a position indicated by the coordinate information designated by the received quality requirements data.

7. The control method for an information processing apparatus according to claim 6, further comprising creating inspection result data obtained as a result of inspection in the performing quality inspection.

8. The control method for an information processing apparatus according to claim 7, wherein, when it is determined that the quality requirements data designates a quality requirements target by identification information of an object, the creating creates the inspection result data by using the identification information of the object.

9. The control method for an information processing apparatus according to claim 7, wherein, when it is determined that the quality requirements data designates a quality requirements target by coordinate information, the creating creates the inspection result data by using the coordinate information.

10. A non-transitory computer-readable storage medium storing one or more programs including instructions for causing a computer to function as the information processing apparatus according to claim 1.

* * * * *